United States Patent [19]
Sapuppo et al.

[11] Patent Number: 5,712,426
[45] Date of Patent: *Jan. 27, 1998

[54] PENDULOUS OSCILLATING GYROSCOPIC AND ACCELEROMETER MULTISENSOR AND AMPLITUDE OSCILLATING GYROSCOPE

[75] Inventors: Michele S. Sapuppo, Andover; Thomas E. Reed, Charlton; Donato Cardarelli, Medfield, all of Mass.

[73] Assignee: Milli Sensory Systems and Actuators, Inc., Newton, Mass.

[*] Notice: The term of this patent shall not extend beyond the expiration date of Pat. No. 5,691,470.

[21] Appl. No.: 551,878

[22] Filed: Oct. 16, 1995

Related U.S. Application Data

[63] Continuation-in-part of Ser. No. 101,392, Aug. 3, 1993, Pat. No. 5,457,993.

[51] Int. Cl.$^6$ .............................. G01P 15/14; G01P 9/02
[52] U.S. Cl. ........................... 73/504.03; 73/504.02; 73/504.09; 73/510
[58] Field of Search ................... 73/504.3, 504.2, 73/504.09, 504.12, 504.18, 510, 511, 514.01, 514.02; 74/5 R, 5.34

[56] References Cited

U.S. PATENT DOCUMENTS

| | | | |
|---|---|---|---|
| 3,456,513 | 7/1969 | Emerson | 73/504.18 |
| 3,477,298 | 11/1969 | Howe | 73/504.09 |
| 3,587,330 | 6/1971 | Deer | 73/504.18 |
| 3,616,699 | 11/1971 | Brand | 73/504.09 |
| 4,275,605 | 6/1981 | Kennel | 74/5.34 |
| 4,464,942 | 8/1984 | Krupnick | 74/5 F |
| 4,598,585 | 7/1986 | Boxenhorn | 73/504.12 |

Primary Examiner—Hezron E. Williams
Assistant Examiner—Helen C. Kwok
Attorney, Agent, or Firm—Brian M. Dingman

[57] ABSTRACT

A pendulous oscillating gyroscope and accelerometer multisensor having an accelerometer input axis and a gyroscopic input axis, comprising: a fixed case; a servo driven member mounted to the case for sinusoidal oscillation about an accelerometer servo axis which is the same as the gyroscopic input axis; a torque summing member mounted to the servo driven member to allow rotational motion about an output axis transverse to the servo axis; a rotor driven member mounted to the torque summing member for sinusoidal oscillation about a reference axis transverse to both the output axis and the servo axis; and a pendulosity carried by at least one of the torque summing member and the rotor driven member to create a mass imbalance about an output axis, in which pendulosity torque due to acceleration along the accelerometer input axis causes a DC rotation of the torque summing member about the output axis. The rotor driven member is sinusoidally oscillated about the reference axis, and the servo driven member is sinusoidally oscillated about the servo axis. The two sinusoidal oscillations create a first gyroscopic torque, which causes DC rotation of the torque summing member about the output axis, and in which DC rotation of the fixed case about the gyroscopic input axis creates a second gyroscopic torque, which causes an AC oscillation of the torque summing member about the output axis. A measurement device determines the rotational motion of the torque summing member about the output axis. A controller responsive to the measurement device alters the oscillation of at least one of the oscillating members to create change in the first gyroscopic torque to counterbalance pendulosity torque. Acceleration along the input axis, and rotation about the servo axis, are both determined.

36 Claims, 21 Drawing Sheets

SCHEMATIC 1 a) INITIAL; RDM-IN-PLANE

SCHEMATIC 1

SCHEMATIC 2 c) SDM-IN-PLANE

SCHEMATIC 3

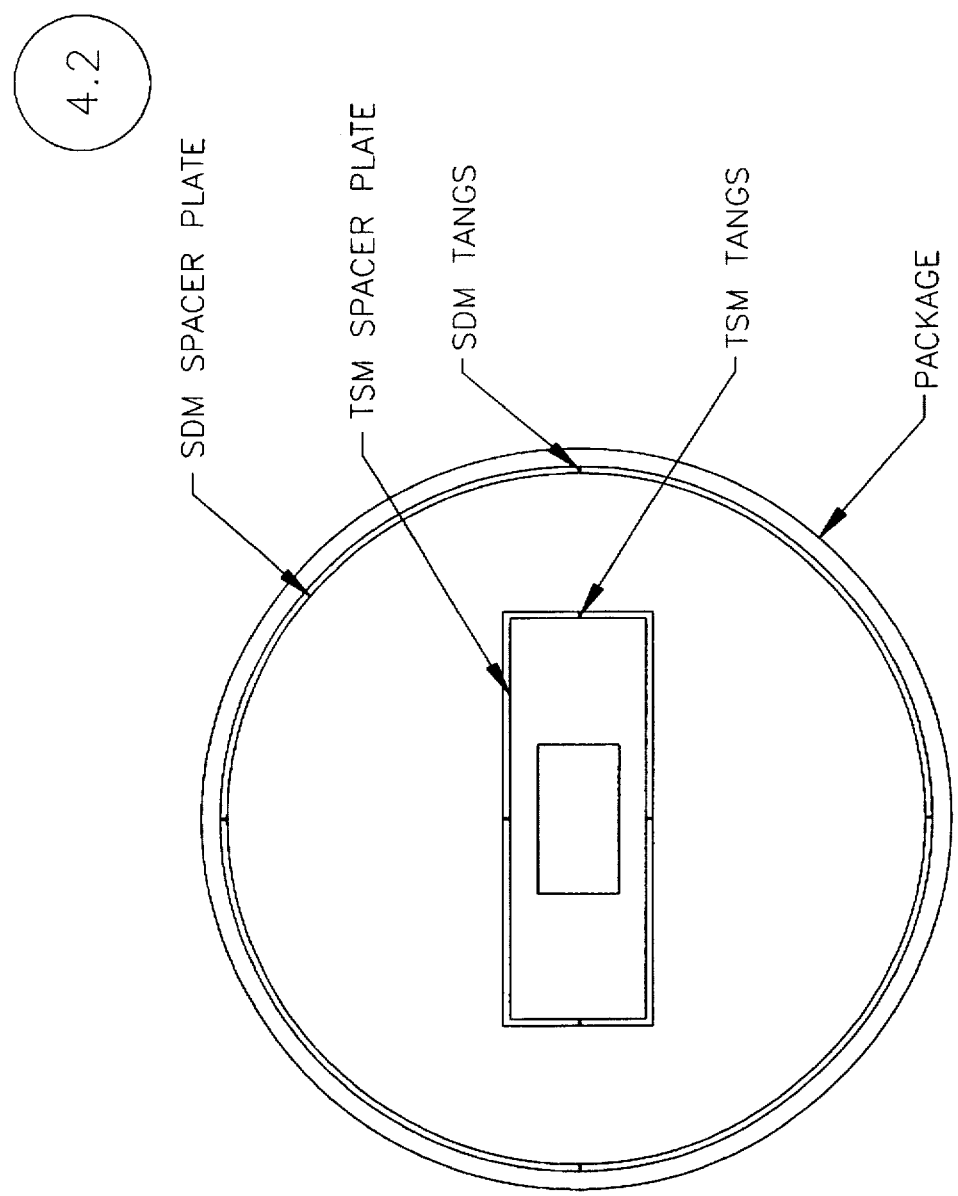
FIG. 4B   RDM DRIVE SPACER

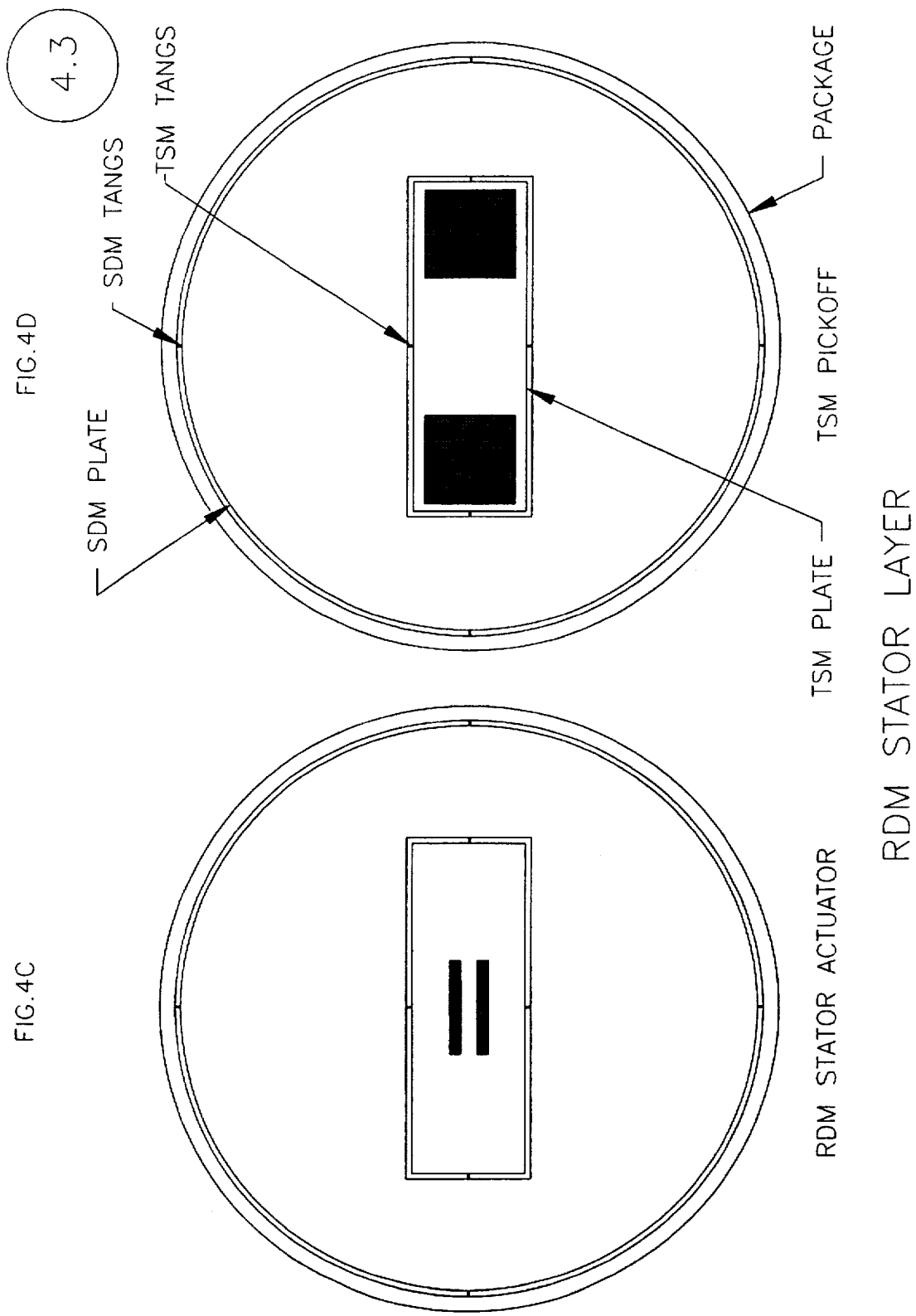

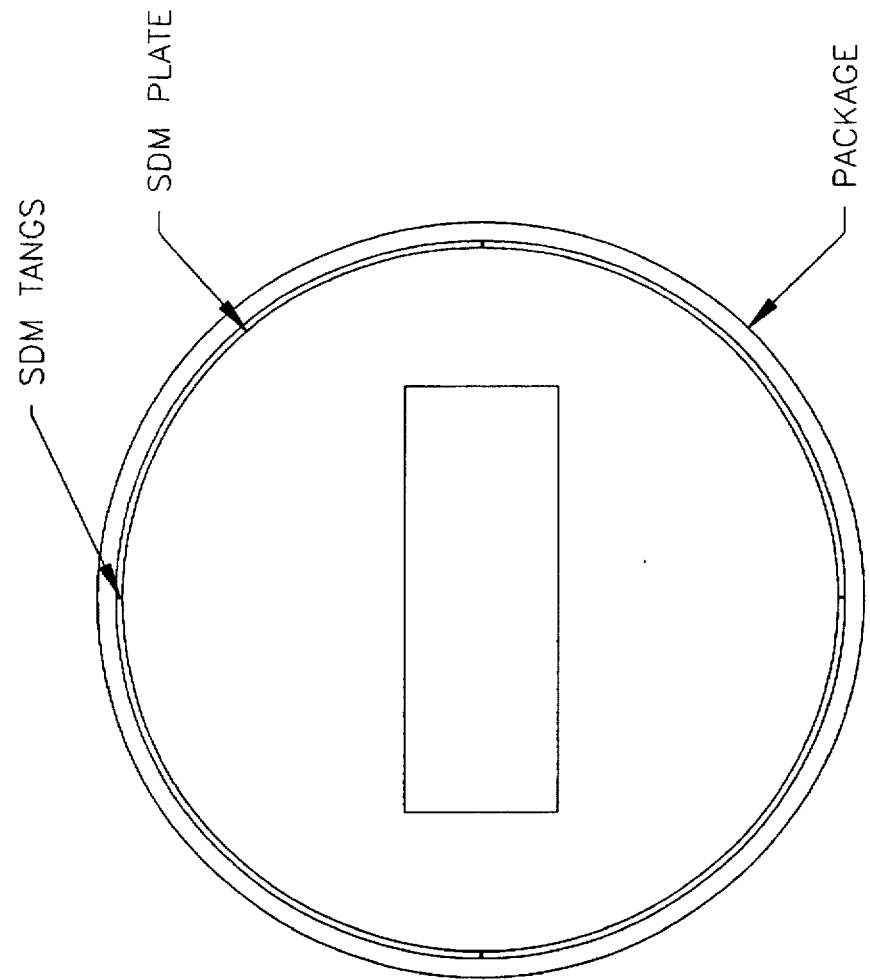

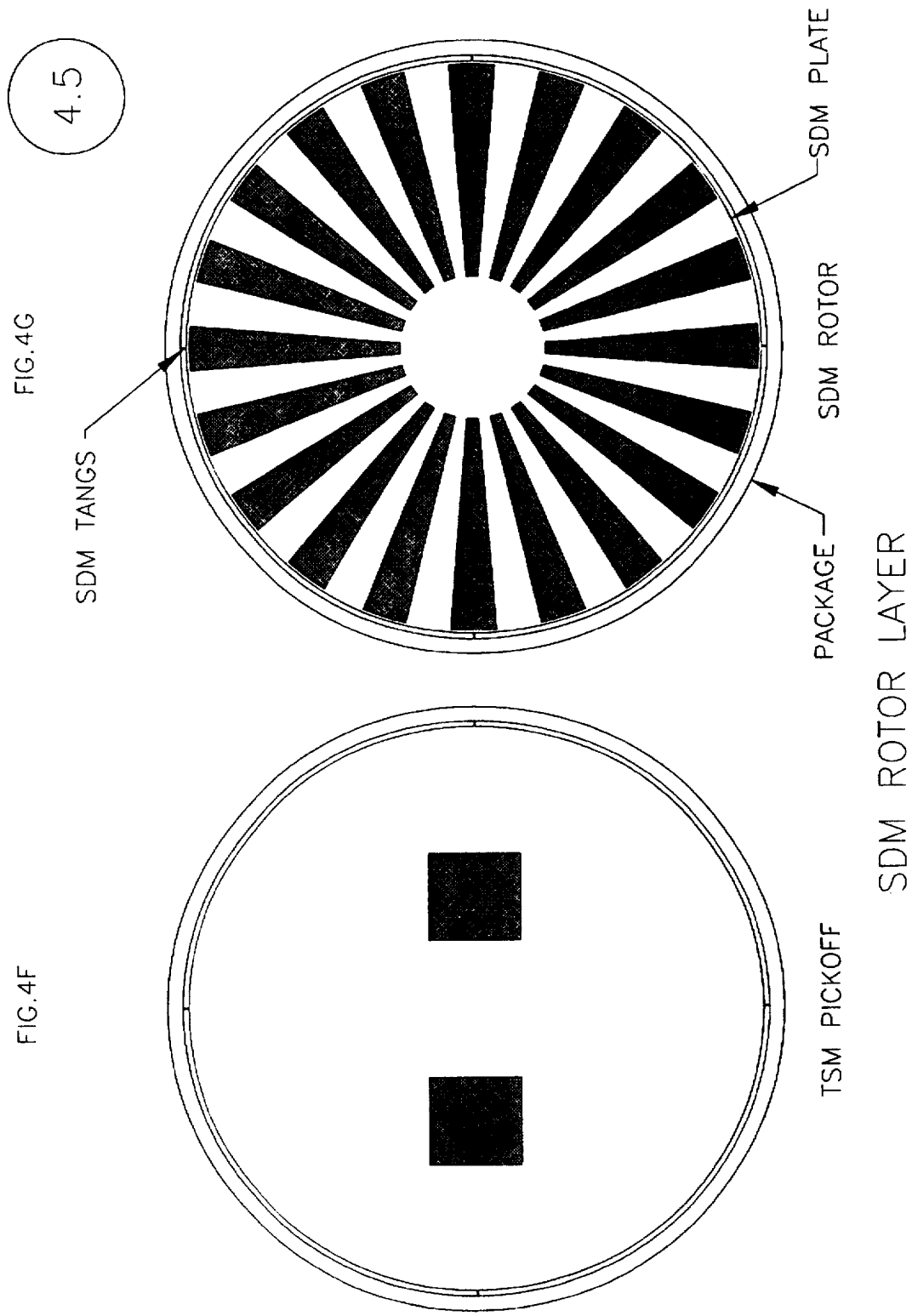

SDM STATOR ACTUATOR

SDM STATOR LAYER

PENDULOUS OSCILLATING GYROSCOPIC AND ACCELEROMETER MULTISENSOR AND AMPLITUDE OSCILLATING GYROSCOPE

RELATED APPLICATIONS

This application is a continuation in part of Ser. No. 101,392, U.S. Pat. No. 5,457,993, filed Aug. 3, 1993, incorporated herein by reference.

FIELD OF INVENTION

This invention relates to a pendulous oscillating gyroscope and accelerometer, that provides acceleration and gyroscopic rate information from a single instrument. It also relates to an amplitude oscillating gyroscope that provides rate information.

BACKGROUND OF INVENTION

Inertial guidance units require three accelerometers and three axes of gyroscopic altitude information in order to measure the specific forces within a known coordinate frame. All present inertial guidance units require three accelerometers and either 2, two-axis gyroscopes, or 3, single degree of freedom gyroscopes.

In all strategic missile applications, ICBMs and SLBMs, the accelerometers are gyroscopic and require compensation from attitude rates which are obtained from separate gyroscopic instruments, either two or three per system.

Gyroscopic accelerometers, such as the Pendulous Integrating Gyroscopic Accelerometer (PIGA) or Specific Force Integrating Receiver (SFIR), have a rate error associated with angular motion about their input axes. This must be compensated by the angular detection of this rate by the inertial grade gyroscopes that are also part of the inertial guidance unit. Thus, inertial guidance units are complex, expensive, heavy systems that are relatively prone to error due to their complexity.

SUMMARY OF INVENTION

It is therefore an object of this invention to reduce the size, weight, complexity, and cost of an inertial guidance system by supplying angular rate information from the system accelerometer.

It is a further object of this invention to supply rate information from a Pendulous Oscillating Gyroscopic Accelerometer (POGA) without instrument modification, except for signal processing electronics.

It is a further object of this invention to eliminate two to three gyroscopic elements previously necessary in inertial guidance systems.

It is a further object of this invention to allow the extraction of angular rate about an axis independent of accelerations of the device, without interfering with accelerometer operation.

It is a further object of this invention to provide a simple Amplitude Oscillating Gyroscope (AOG).

This invention results from the realization that an angular rate about the POGA Servo Driven Member (SDM) axis produces an output signal that is unique and independently extractable without affect of or on the acceleration output signal.

The POGA is a pendulous gyroscopic accelerometer that develops gyroscopic torque to balance pendulous torque by oscillating a momentum mass about the reference axis and oscillating the servo driven member about the servo axis. The planar designs allow the fabrication of the instrument using planar technologies such as millifabrication and microfabrication as well as the traditional machining.

The Pendulous Oscillating Gyroscopic Accelerometer (POGA) was first specified in U.S. Pat. No. 5,457,993, incorporated herein by reference. The patent disclosure applies to traditional three dimensional design and fabrication. It also applies to one planar configuration that can be designed and fabricated using planar methods.

The POGA consists of three members connected so that they are allowed to rotate about three orthogonal axes, and a fixed member that is attachable to the vehicle or system. They may be called, the Rotor Driven Member (RDM), the Torque Summing Member (TSM), the Servo Driven Member (SDM) and the case or housing, respectively. The RDM is the angular momentum generator also referred to as the momentum mass. The TSM is the purposely mass-unbalanced member (pendulum) which rotates in response to acceleration-induced torque. Since the TSM carries the RDM, the mass imbalance can also be fully or partially along the RDM axis. The TSM also reacts to gyroscopic torque. The two torques are added on the TSM to cancel. The SDM is so-called because it is the member which is oscillated to provide the counterbalance torque at the TSM so as to servo the TSM back to null (balanced position). The case or housing are the means to contain the instrument, attach it to the system or vehicle, and to allow a surface against which to actuate the SDM.

The order of connection starts with the RDM as the innermost member, connected to the TSM, which connects to the SDM, which in turn connects to the outermost member, the case.

The rotation axes for the three moving members are called: the reference axis for the RDM, the output axis for the TSM and the servo axis for the SDM. The accelerometer input axis will depend on the design configuration and the position placement of the unbalance on the TSM.

The three dimensional PIGA design consists of members which are in cylindrical form. The reason is that the RDM and SDM members need to continuously rotate. The planar designs of the POGA emerged since the members are oscillated through a small angle, and therefore can take shapes other than cylinders. Since the members are not cylindrical they can also be oriented to optimize the efficiency of the actuators driving them. The mode of assembly becomes the stacking of parts.

The first planar design features the oscillation of the RDM in the plane. The second and third planar designs feature the rotation of the TSM in the plane and the SDM in the plane, respectively. All three planar designs will allow the full set of disclosed options in the drive of the oscillators and the detection of their movements. The first is also described in U.S. Pat. No. 5,457,993.

The description of the POGA in U.S. Pat. No. 5,457,993, including the three dimensional and first planar design, is limited in its operability. It does not include the servo of the TSM to null by way of a frequency change. It does not include the servo of either the RDM oscillation amplitude or the SDM amplitude, or both, as a means to maintain the TSM at null. It does not fully specify the options for drive frequency selection, pick-off selections, and actuation selections.

It is therefore an object of this invention to provide a second planar design which features these movements: RDM in and out of the plane, TSM in the plane and the SDM in and out of the plane.

It is a further object of this invention to provide a third planar design which features these movements: RDM in and out of the plane, TSM in and out of the plane and the SDM in the plane.

It is a further object of this invention to include non-cylindrical forms for the moving members.

It is a further object of this invention to consider the planar designs as consisting of a set of planar entities (layers) which can be stacked to form the instrument.

It is a further object of this invention to consider the stacked instrument as a flat-pack design.

It is a further object of this invention for the stacked design to result in a completed packaged instrument.

It is a further object of this invention to provide an extensive set of options for the manner in which the RDM and SDM are driven and the manner in which their motion and that of the TSM are detected.

It is a further object of this invention to design the instrument to take advantage of the dynamics of moving parts to reduce the power required to operate. This includes low resistance to movement as well as operating at or near resonance.

It is an object of this invention to scale the members in order to trade off performance with size and power.

It is an object of this invention to include conventional fabrication and design technologies as well as milli and micro-fabrication technologies.

It is an object of this invention to utilize millifabrication technology as an extension of microfabrication technologies to larger sizes for greater performance.

It is an object of this invention to provide a frequency change as a feedback to provide servo for the TSM rebalance torque.

It is a further object of this invention to provide amplitude change from either the RDM or the SDM or both as a feedback to provide servo for the TSM rebalance torque.

This invention features embodiments of a pendulous oscillating gyroscopic accelerometer. Most generally, the accelerometer includes a pendulous oscillating gyroscopic accelerometer, comprising: a fixed case; a servo driven member mounted to the case for oscillation about a servo axis; a torque summing member mounted to the servo driven member for rotation about an output axis transverse to the servo axis; a rotor driven member mounted to the torque summing member for oscillation about a reference axis transverse to both the output axis and the servo axis; a pendulosity carried by at least one of the torque summing member and the rotor driven member to create a mass imbalance about the output axis; a first oscillation device (actuator) for oscillating the rotor driven member about the reference axis, the oscillation having a first amplitude, a first frequency and a first phase; a second oscillation device for oscillating the servo driven member about the servo axis, the oscillation having a second amplitude, a second frequency and a second phase; a measurement device for determining the rotation of the torque summing member about the output axis resulting from pendulosity torque caused by acceleration of the pendulosity; a controller, responsive to the measurement device, for altering the oscillation caused by at least one of the oscillation devices to create torque to counterbalance pendulosity torque; and a determinator, responsive to the controller, for determining acceleration along the input axis.

In one embodiment, the servo driven member and the torque summing member rotate about their pivot axes, and the rotor driven member rotates in the plane. In a second embodiment, the servo driven member and the rotor driven member rotate about their pivot axes, and the torque summing member rotates in the plane. In a third embodiment, the torque summing member and the rotor driven member rotate about their pivot axes, and the servo driven member rotates in the plane.

The advantages to be gained from the use of the POGA with the addition of a rate sensing capability, in an inertial system, are as follows:

1. It reduces the number of instruments from six to three.
2. It reduces the number of instrument types from two to one, a distinct advantage in development, qualification, acquisition, and maintenance.
3. It synchronizes all inertial information with a common frequency, minimizing data latency problems.
4. It eliminates attitude and acceleration vector misalignments. This simplifies the dynamic calibration when used with external sensors.
5. It significantly reduces the amount of support electronics.

The POGA can be used as a multi-sensor, with outputs indicating both acceleration and rotation about appropriate axes, by adding to the POGA a phase sensitive demodulator which is referenced to the oscillating frequency and that has the POGA output axis angular position signal as an input to produce a signal linearly related to the angular rate about the POGA SDM axis. The demodulator required for the extraction of angular rate signals can be of any design that produces a component of output proportional to the content of the input in phase with the demodulator reference.

BRIEF DESCRIPTION OF THE DRAWINGS

Other objects, features and advantages will occur to those skilled in the art from the following description of the preferred embodiments and the accompanying drawings, in which:

FIGS. 4A through 4I are more detailed schematic drawings of the different layers of the design of FIG. 3;

DESCRIPTION OF THE PREFERRED EMBODIMENTS

Figure 1:
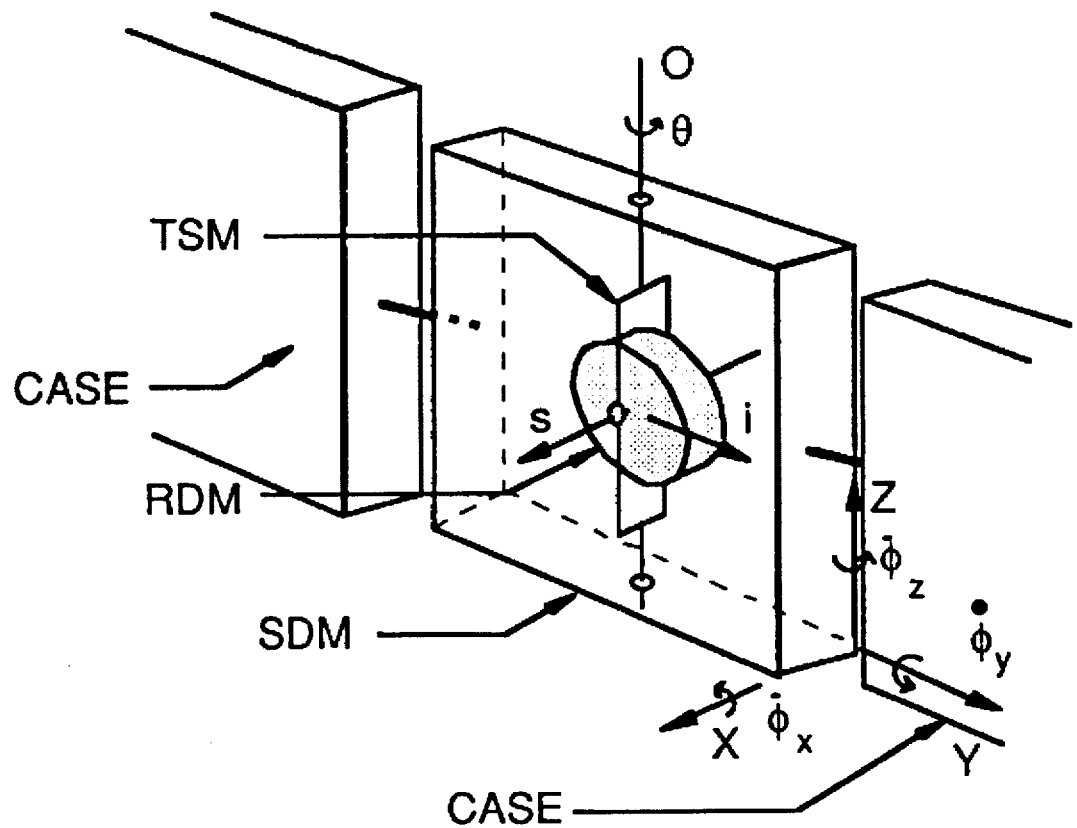
FIG. 1 is a general diagram used to define the symbols used in this patent application.

FIG. 1 is used to define the symbols used in the following analysis, in which the operation of the POGA is derived. All equations are grouped together below.

The fundamental equation applied to determine the TSM equation of motion (equation 1) is that the rate of change of angular momentum is equal to the applied torque. This is Newton's second law in rotational form. In equation 1 $(d\overline{H}/dt)_I$ represents the time rate of change of $\overline{H}$, the angular momentum vector, with respect to inertial space, while $\overline{L}$ represents the applied torque vector. Equation 1 will be applied to the TSM as per equation 2, where $\overline{H}_f$ is the angular momentum of the TSM, $(d\overline{H}_f/dt)_f$ is the time derivative of $\overline{H}_f$ relative to the $\hat{s}$, $\hat{i}$, $\hat{o}$ coordinate system, $\overline{\omega}$ is the angular velocity of the TSM or $\hat{s}$, $\hat{i}$, $\hat{o}$ coordinate system in inertial space, $\overline{\phi}$ is the angular velocity of the SDM or x, y, z coordinate system in inertial space, and the subscript "f" refers to the TSM.

The TSM angular momentum, $\overline{H}_f$, is shown in equation 3, where $\hat{s}$ is a unit vector in the s direction.

The TSM angular momentum, $\overline{H}_f$, is the sum of the angular momentum of the oscillating rotor and that of the TSM which holds the rotor. An assumption is that there is no other motion of the rotor relative to the TSM.

$\overline{H}_r$ is the angular momentum of the rotor.

$\overline{I}$ is the moment of inertia tensor of the TSM.
To calculate equation 2 we group by components, as shown in equations 4 through 6.

Since the TSM can only rotate about the ô axis in the $\hat{s}$, $\hat{i}$, $\hat{o}$ coordinate system, then only one torque component (about the ô axis) is required for further analysis. The other torque components, $L_{fs}$ and $L_{fi}$, are cancelled by the pivot with which the TSM rotates.

There is one term left, $(d\overline{H}_f/dt)_f = L_{fo}\hat{o}$, where $L_{fo}$ is defined in equation 7.

An assumption is made to simplify the analysis further by setting $I_i = I_s$ so that one term drops out. Equation 7 then becomes equation 8.

Since the TSM is subject to damping and spring forces (especially true for the POGA), then the torque can be generally written as shown in equation 9.

This is a phenomenological expression and also includes $L_e$ as a general error torque and $L_a$ as an applied torque. $L_a$ can be a torque applied directly to the float as by pendulosity under the influence of acceleration.

By equating the torques of equations 8 and 9, equation 10 is derived.

Equation 10 is the equation of motion for the TSM. It is referred to as the output axis equation since it describes the angular motion, υ, as a function of rotation about axis ŷ.

But first further simplifications are made: 1. the non-linear term $H_r\upsilon\phi_x$ is dropped for this illustration 2. $L_e$ is assumed zero; and 3. $I_o\dot\phi_z$ is inconsequential since rotation of the SDM about ẑ is not allowed by the pivot. The result is shown in equation 11.

For the POGA, the RDM and SDM are in oscillation, therefore $H_r$ and $\dot\phi_y$ are oscillatory, so their forms can be generally stated as in equation 12, where $\phi_y$ is the amplitude of the SDM oscillation and δ is the relative phase between the RDM and SDM. The amplitude of the RDM can be expressed in a similar way as in equation 13, from which the RDM angular momentum can be obtained from the expression of equation 14. $\omega_y$ and $\omega_r$ are the frequencies of oscillation of the SDM and RDM respectively.

With the oscillation frequencies for the RDM and SDM set at the same value, the time dependence for the TSM, after reaching its steady state condition, consists of a DC displacement and a 2ω oscillatory component as shown in equation 15. A(ω) and B(ω) are frequency dependent coefficients.

What has been derived is the frequency dependence of the output axis equation which describes the movement of the TSM. It is not desirable for the resonance frequency of the TSM to be at 2ω, since its DC motion is of most interest.

The first term, the DC term, gives the gyroscopic reactive term which is used to balance the pendulous torque. So, for the total torque to be zero, equation 16 must be followed. Equation 16 can be rewritten as equation 17, in which $m_p$ is the pendulous mass and $R_p$ the radius to the center of gravity of the pendulous mass and a is the acceleration magnitude. A solution for acceleration can be made to derive equation 18, where $m_r$ is the mass of the RDM and $R_r$ is the radius of the RDM for the case of a disk RDM.

The angle of rotation for the unrebalanced TSM corresponding to acceleration is given by equation 19 in which K is the spring constant of the TSM flexure. The angle can be related to acceleration by equation 20.

RDM EQUATION OF MOTION

Equation 21 is the equation of motion for the RDM that is flexurally mounted to the TSM subject to damping, $D_r$, and a spring constant $K_r$, where $L_r = \tilde{L}_r \sin(\omega_r t)$ and $\tilde{L}_r$ is the drive torque amplitude applied to the rotor. Equation 22 is the form of the solution from which the phase is defined by equation 23, and the amplitude of the RDM oscillation is related to the drive torque by equations 24 and 25, where $I_r$ is the moment of inertia of the TSM about its rotational axis (the output axis), $L_r$ is the drive torque, $\omega_{ro}$ is the resonant frequency of the RDM, and $D_r$ is the damping coefficient of the RDM.

SMD EQUATION OF MOTION

The equation of motion for the SDM that is flexurally mounted to the housing or case subject to damping, $D_y$, and a spring constant, $K_y$, can be written as equation 27, where $L_y = \tilde{L}_y \sin(\omega_y t)$, and $\tilde{L}_y$ is the drive torque amplitude applied to the SDM. And where $\phi_y(t) = \phi_y \sin(\omega_y t - \epsilon_y)$ is the form of the solution from which the phase is defined by equations 28 and 29, and the amplitude of the SDM oscillation is given relative to the drive torque by equation 30, where $I_i$ and $J_y$ are the moment of inertia components of the TSM and SDM about the SDM oscillation axis, respectively.

The torque amplitude required to drive the SDM at a constant peak-to-peak angular deviation, given the frequency-dependent properties of the inertia/flexure problem, is given by equation 31.

Operability approaches

Since the pendulous torque is a DC term it is necessary for the analysis to produce a DC gyroscopic torque. This occurs for the case where the RDM and SDM oscillation frequencies are equal. In addition to the DC term, though, a 2ω term is also present in the movement of the TSM. This result was expressed in the FIGS. 4, 5, 6, and 7 of U.S. Pat. No. 5,457,993. The above mathematical analysis justifies the pictorials of those figures. The balance of the DC torques results in an expression for acceleration (equation 18) that relates acceleration to amplitudes, phases and frequencies that can be varied. The operability approaches refer to 1. varying the phase, 2. varying the amplitudes, or 3. varying the frequency to balance the pendulous torque.

For the case where the phase is held constant and the amplitude of the SDM oscillation is varied to balance the acceleration-induced pendulosity, the RDM oscillation amplitude can also be varied. In fact, either or both may be varied. This approach yields a linear scale factor (proportionality) as given by the constant factor in the square parenthesis of equation 32 if only one amplitude is varied. For this approach, the maximum acceleration balanced on the TSM is limited by the geometry of the actuator, and the available power. They determine the maximum RDM and SDM amplitudes achievable. It is also max for $\delta=0$.

For the approach specified for which the amplitudes are kept constant and the $\delta$ phase is varied, the scale factor is a cosine function since the relationship between the phase and acceleration goes as the cosine of the difference of phases. The maximum acceleration balanced on the TSM is bounded by $\delta=0$. The relationship is given by equation 33.

An additional approach in the way the instrument is operated is also derivable from the relation which specifies acceleration. The variation in gyroscopic torque can be generated by varying the common oscillation frequency of operation for the RDM and SDM. There are at least two cases or approaches for this means of operation. For the first the amplitudes and phases are kept constant while the common frequency is varied. The scale factor for this case is parabolic since it goes as $\omega^2$. In addition, this case would require a require a bias TSM deflection for zero acceleration since the scale factor only generates positive torques. The relationship is given by equation 34a. The maximum acceleration is achieved for $\delta=0$.

The second mode of operation using frequency feedback is based on the dynamic characteristics of the spring-restrained, damped SDM and RDM oscillators. The acceleration equation is more accurately written as shown in equation 34.

The scale factor which relates acceleration to oscillation frequency is a function of its place relative to the resonance frequencies of the RDM and SDM. Note that for this case both the amplitudes and phases vary over the frequency spectrum.

Any combination of the four means of operating the instrument are also possible. That is, a combination with either phase variable or fixed and with either amplitude fixed or varied and with the common frequency fixed or varied can be utilized.

Drive approaches

These include the approaches for the way that the RDM and SDM are driven. Since they are spring-restrained, damped oscillators, the RDM and the SDM can be operated at resonance by the adjustment of their inertias and flexural spring constants. The purpose for this selection is that resonance operation provides an oscillation amplitude for less power. The choices are: 1. The RDM and SDM are both operated at resonance; 2. The RDM is operated at resonance and the SDM is not; 3. the RDM is not operated at resonance and the SDM is; and 4. the RDM and SDM are not operated at resonance. It is also possible to control the degree of resonance by controlling the Q of the oscillators. This can provide a degree of flexibility in the way the instrument is operated as described in the previous section on operability approaches.

Actuation approaches

The RDM and SDM need to be actuated in order to oscillate. The location of the means by which this is done is varied. The optimum method is to locate the actuator for the RDM on the TSM. The optimum method for the SDM is to locate it on the fixed member, (the case or housing).

The means to actuate the RDM and the SDM may include electrostatic or electromagnetic approaches in any combination. These types of actuators are known in the field of millimachined motors.

The means also need to be employed to minimize the influences of each actuator on unintended members. Means also need to be employed to minimize the influence of the actuators on the TSM, as any such influence corresponds to an output error.

The direction of force for each actuator also depends on the mechanical configuration of the RDM and SDM. A transverse force may be necessary to oscillate an RDM or SDM that needs to oscillate in the plane. A normal force may be necessary to actuate an RDM or SDM that needs to oscillate in and out of the plane. A normal force is one that is directed perpendicular to the surface of the member.

Pick-off approaches

The TSM requires a pick-off to detect the rotational motion about the output axis in order for a feedback to maintain it at null. The pick-off design may be electrostatic, electromagnetic, optical or other, which may include other photonic approaches, etc., as known in the art of the detection of very small distances and/or angular changes.

The amplitudes and phases of the RDM and SDM also require control in some of the operability approaches specified above. This is done through the detection of the oscillations. The means for doing so may include the same approaches as specified for the TSM above.

Design Variations

Because the POGA instrument requires oscillations instead of continuous motions for the RDM and SDM, the designs may utilize non-traditional, non-cylindrical shapes for the three members. This allows for the orientations of the members to be selected to take advantage of different actuator and pick-off designs and to improve the dynamics of their motions and reduce the power required to drive them. Three configurations exist. The first was disclosed in U.S. Pat. No. 5,457,993. It featured an in-plane motion of the RDM. The second features the in-plane motion of the TSM. The third features the in-plane motion of the SDM. Each configuration will result in a different instrument. The second configuration allows the use of actuators which apply a normal force for both the RDM and SDM, while the third has in-plane motion of the SDM which is less subject to damping.

Figure 2A:
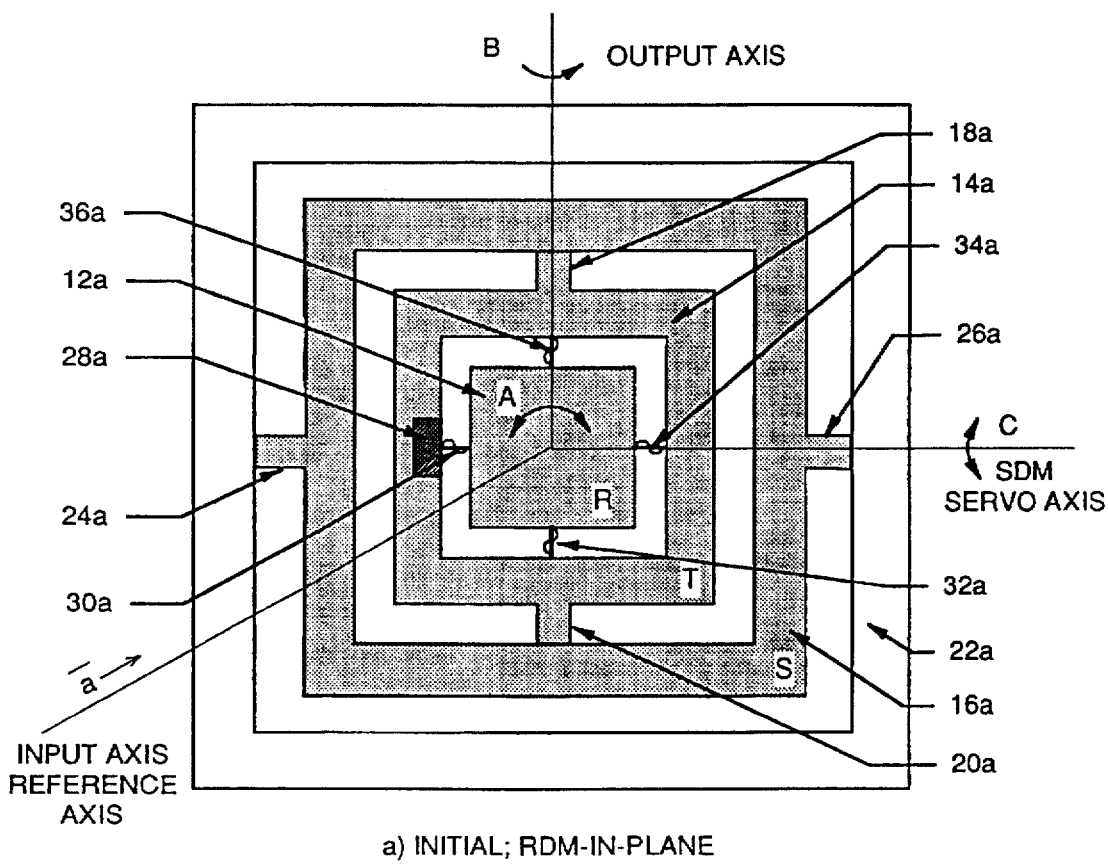
FIGS. 2A through 2C are schematic diagrams of three different embodiments of the pendulous oscillating gyroscopic accelerometer useful in understanding this invention, all planar or flat-pack designs. The designs can also be made in the three dimensional form in which one or more of the moving members is another shape such as cylindrical.

There is shown in FIG. 2A a pendulous oscillating gyroscopic accelerometer 10a according to this invention. Device 10a includes an RDM 12a that is oscillated about the reference axis as shown by arrow A. RDM 12a is pivotably mounted to the TSM 14a by mounts 30a, 32a, 34a, 36a. These mounts are representative of the particular design shown. Other approaches are also possible. RDM 12a rides within TSM 14a which itself is pivotably mounted to the SDM 16a by mounts 18a and 20a that allow member 14a to pivot about the output axis as shown by arrow B. SDM 16a is itself pivotably attached to fixed member (housing or case) 22a through mounts 24a and 26a. SDM 16a is oscillated about the SDM servo axis as shown by arrow C. The pendulosity in this case is created by mass 28a that may be fixed to the RDM 12a and/or TSM 14a. In this case it is fixed to the TSM, and the input axis is thereby defined as being along the reference axis. The pendulosity is acted upon by a specific force a acting along the input axis. The TSM 14a rotates about the output axis, and a read-out (not shown) measures the angle of rotation. A servo loop (not shown) provides a response to the RDM and/or SDM actuators (not shown) to vary the relative phases or the amplitudes of oscillation, or the common frequency of oscillation, to counterbalance the pendulosity torque. The phase difference, amplitudes or frequency change then become a measure of acceleration detected.

Figure 2B:
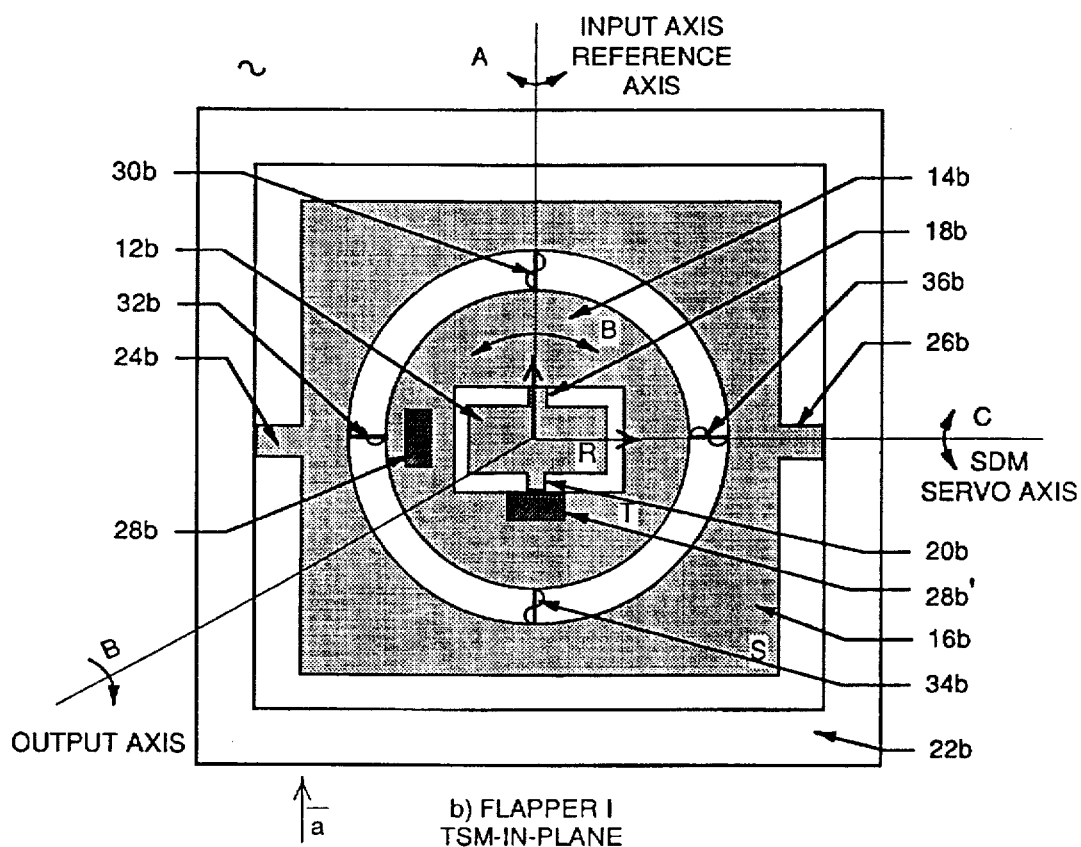

FIG. 2B is a schematic diagram of the second planar design of the pendulous oscillating gyroscopic accelerometer 10b of this invention. Device 10b includes an RDM 12b that is oscillated about the reference axis as shown by arrow A. RDM 12b is pivotably mounted to the TSM 14b by mounts 18b and 20b. RDM 12b rides within TSM 14b which itself is pivotably mounted to the SDM 16b by mounts 30b, 32b, 34b, 36b that allow member 14b to pivot about the output axis in the plane as shown by arrow B. These mounts are representative of the particular design shown. Other approaches are also possible. SDM 16b is itself pivotably attached to fixed member (housing) 22b through mounts 24b and 26b. SDM 16b is oscillated about the SDM servo axis as shown by arrow C.

The pendulosity in this case is created by mass 28b that is fixed to the TSM member 14b. The input axis is defined approximately as along the reference axis. If the pendulosity mass were placed at location 28b', the output axis would be along the SDM axis. Somewhere in between these two positions is also possible.

Figure 2C:
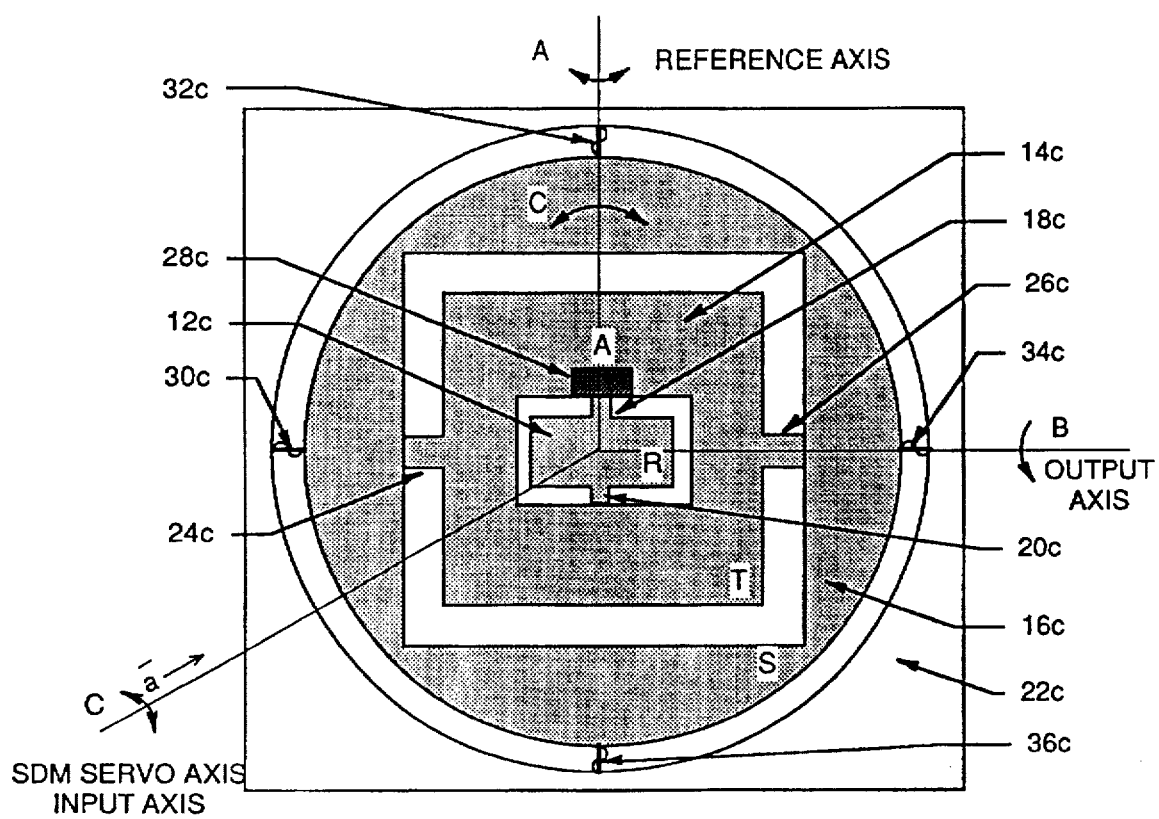

FIG. 2C is a schematic diagram of the third planar design of the pendulous oscillating gyroscopic accelerometer 10c of this invention. Device 10c includes an RDM 12c that is oscillated about the reference axis as shown by arrow A. RDM 12c is pivotably mounted to the TSM 14c by mounts 18c and 20c. RDM 12c rides within TSM 14c which itself is pivotably mounted to the SDM 16c by mounts 24c and 26c that allow member 14c to pivot about the output axis as shown by arrow B. SDM 16c is itself pivotably attached to fixed member (housing) 22c, through mounts 30c, 32c, 34c, 36c. These mounts are representative of the particular design shown. Other approaches are also possible. SDM 16c is oscillated about the SDM servo axis as shown by arrow C.

The pendulosity in this case is created by mass 28c that is fixed to the TSM 14c. The input axis is defined along the SDM servo axis.

The theory of operation of the different embodiments of the pendulous oscillating gyroscopic accelerometer of this invention is the same as illustrated U.S. Pat. No. 5,457,993, for the cases where: 1. the phase is held constant and the amplitudes are varied to generate the gyroscopic torque to balance the pendulous torque and 2. the amplitudes are held constant and the relative phase is varied. For 1. the amplitude change is related to the acceleration measured. For 2. the relative phase is related to the acceleration.

There are at least two modes of operation for the frequency feedback approach. For the first there is no dependence of the RDM and SDM oscillator amplitudes and phases on the frequency of operation, flat response. The scale factor does not give a change in sign for any value of frequency, however, and it goes as $\omega^2$. In order to provide a rebalance torque, for positive and negative accelerations, the TSM would have to have a natural, mechanical position that is offset from the geometric alignment with the other members in the plane. This would mean that by increasing the frequency from zero there will be a frequency that will torque the TSM into geometric alignment. This is the bias frequency. Now in reaction to an acceleration, the frequency will either increase or decrease from the bias position. The TSM mounts are always in a position of stress for this case since the read-out null is at the geometric null and not the mechanical null.

For the second mode of operation, the RDM and the SDM have phases and amplitudes that are a function of frequency. The inertias and spring constants are selected so that the resonance of the RDM or SDM or both are close to the frequency of operation. As the frequency is varied, the torque will vary according to a function specified by the resonance condition of the two oscillators. The function will pass through zero providing for rebalance torque for positive and negative accelerations. The output of this approach is a frequency change from the value at null position.

Figure 3:
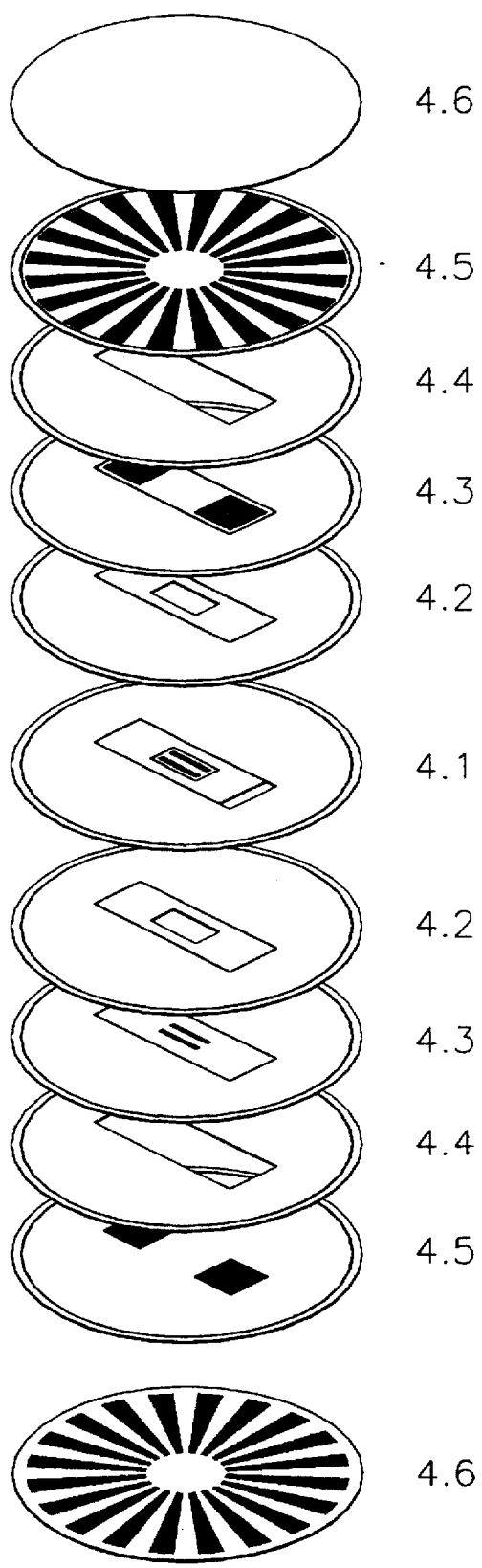
FIG. 3 is an exploded view of a flat-pack design of the embodiment shown in FIG. 2C.

The third design shown in FIG. 2C has the SDM movement in the SDM plane. A practical, millimachinable design for this approach is indicated as a multi-layered, flat-pack as shown in FIG. 3 in exploded view. The layers are numbered 4.1–4.6. The same number for two layers indicates that they are of the same design. FIG. 2C illustrates in more detail the mechanical layer (layer 4.1 ) of FIG. 3.

Unlike the schematic descriptions of FIGS. 2A, 2B and 2C, the design of FIG. 3 represents the full configurational description with the inclusion of the actuators and the pick-offs. The outside concentric ring constitutes the outside package or case when all layers are stacked. This approach to design allows the different components to be in different layers so that they can be fabricated and optimized independently. With stacking the instrument is composed and fully packaged.

Figure 4A:
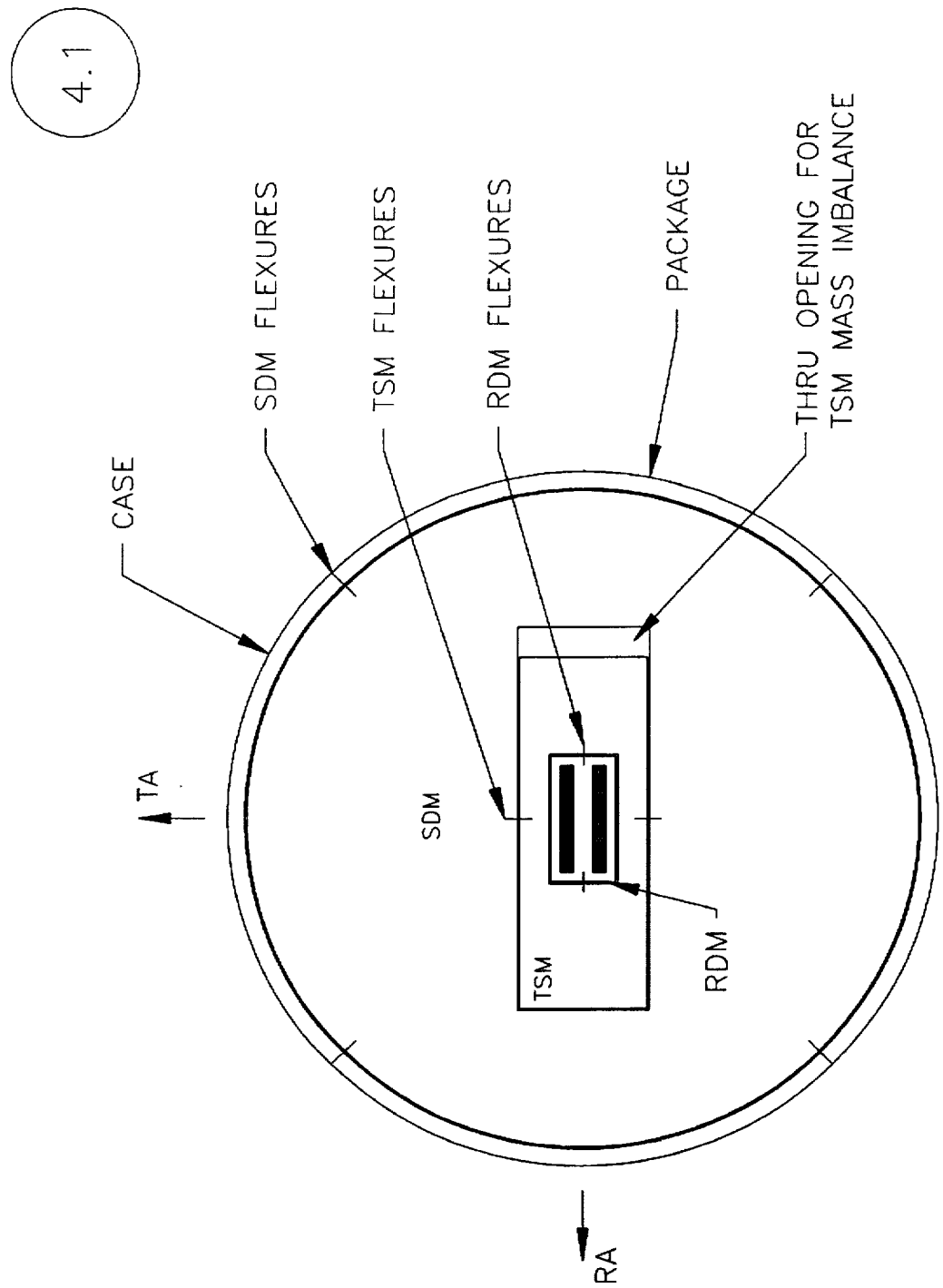

Layer-by-layer descriptions follow. FIG. 4A shows layer 4.1, the mechanical layer. It contains four SDM flexures (holding the SDM to the case), in schematic form, an SDM, two TSM flexures, a TSM with pendulosity in the plane obtained by making the TSM dimension shorter on the right side, two RDM flexures and an RDM. The darkened plates on the RDM are capacitive actuator rotor plates used to drive the RDM. These are placed on both sides of the layer. The stators that drive the RDM are located on layer 4.3 (FIG. 4C). The SDM oscillates in the plane and the RDM in and out of the plane. The TSM turns in and out of the plane. It is sufficient to describe the operation of the POGA with just this layer. The other layers provide the drives and pick-offs.

Layers 4.2 (FIG. 4B) are RDM drive spacer layers. They are of sufficient thickness to form a cavity for the RDM to turn in when the layers are assembled. The layers contain four SDM tangs, an SDM spacer plate, four TSM tangs and a TSM spacer plate. The tangs are assembly aids which keep the parts together until assembly is made. The tangs are then removed so that the two plates can move with the corresponding TSM and SDM in the mechanical layer. The TSM and SDM spacer plates become part of the TSM and SDM. There is the option of depositing films directly to the thickness required instead of providing a separate layer. The criteria is whether the thickness can be deposited practically.

Layers 4.3 (FIGS. 4C and 4D) are the SDM Stator Layers. Two views are shown since the two sides of the layers are different. FIG. 4C contains the RDM actuator stator which is used with the rotor actuator capacitive pattern of the RDM to drive the RDM. FIG. 4D contains the TSM pick-off capacitive pattern which work with corresponding patterns on layers 4.5 to detect the motion of the TSM. These layers (4.3) also contain the outside package, the SDM tangs, the SDM plate, the TSM tangs and the TSM plate. The same applies to these tangs and plates as were described for layers 4.2.

Layers 4.4 (FIG. 4E) are the TSM pick-off spacers. They are of sufficient thickness to allow the TSM to rotate when the layers are assembled. The layers also contain SDM tangs for assembly and an SDM plate. There is the option of depositing this layer directly if the thickness is within practical limits.

Layers 4.5 (FIGS. 4F and 4G) are the SDM rotor layers. Two views are shown since the two sides of the layers are different. FIG. 4F contains two capacitive patterns for the detection of the TSM rotation. FIG. 4G contains the capacitive actuator rotor pattern for electrostatically driving the SDM in the plane. This representation is only illustrative and meant to imply that a pattern of this type may be used. The layers also contains the SDM tangs for assembly, the SDM plates, and the outer package.

Figure 4I:
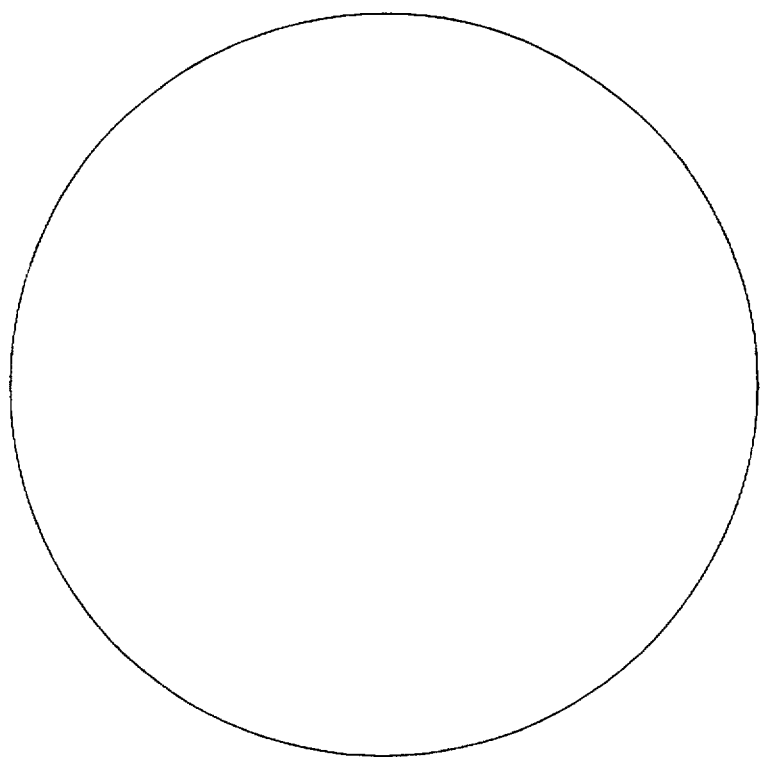
Figure 4H:
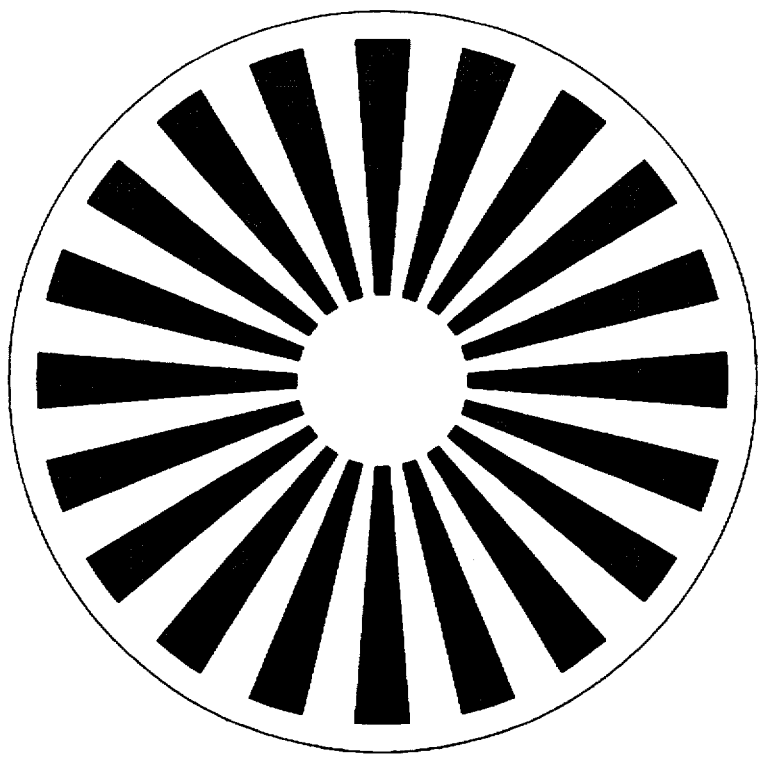
Figure 5:
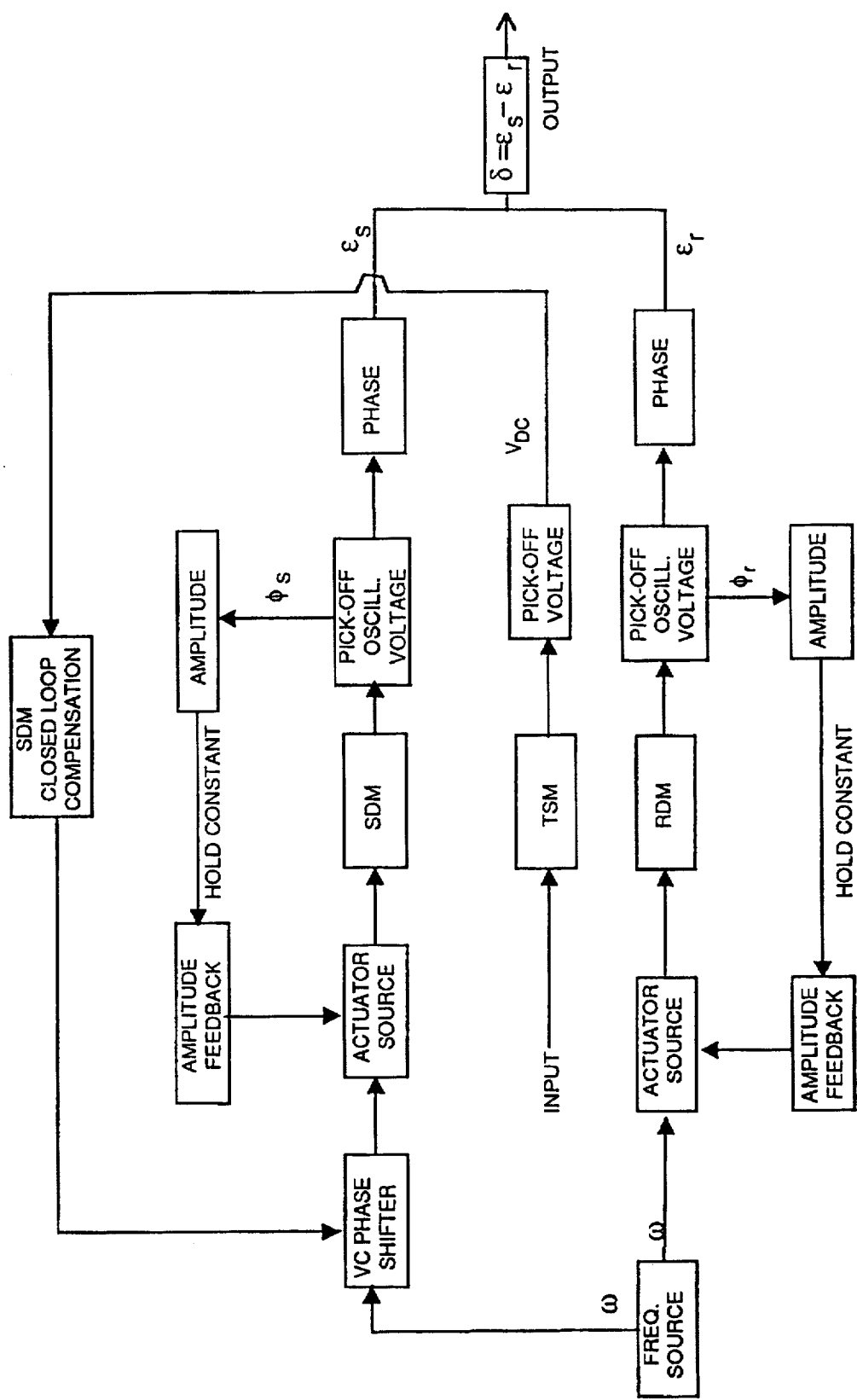
FIG. 5 is a schematic block diagram of an operating accelerometer using phase feedback operation.

Layers 4.6 (FIGS. 4H and 4I) are the SDM stator actuator layers as well as the outside top and bottom covers of the package. FIG. 4H illustrates a typical electrostatic stator pattern. It would work with that on the layers 4.5 to drive the SDM to oscillate in the plane. FIG. 4I shows the cover surface.

Note that the TSM, RDM and SDM move within separate cavities.

In an alternate configuration the SDM flexures might be placed on the SDM rotor layers instead of the mechanical layer. All flexures are illustrative only, and indicate the allowed axes of rotation for the three members.

Although a flat-pack design is demonstrated in FIG. 3, a conventional three dimensional configuration using conventional machining could be pursued. This is also true for the designs based on FIGS. 2A and 2B. Three dimensional designs could have members whose surfaces are in three orthogonal planes as opposed to one as shown.

Operation schematics

Figure 6:
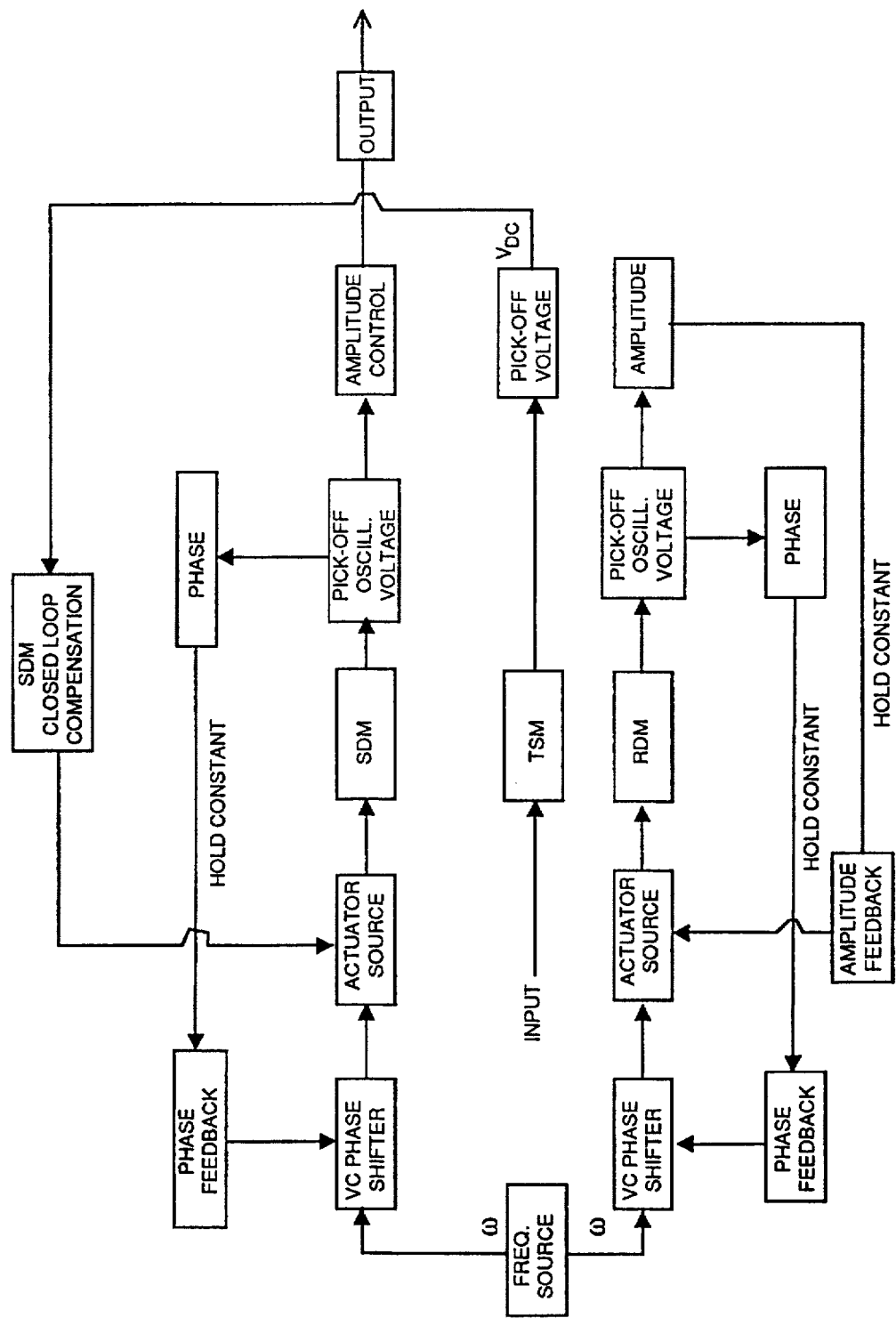
FIG. 6 is a similar diagram using amplitude feedback operation.
Figure 7:
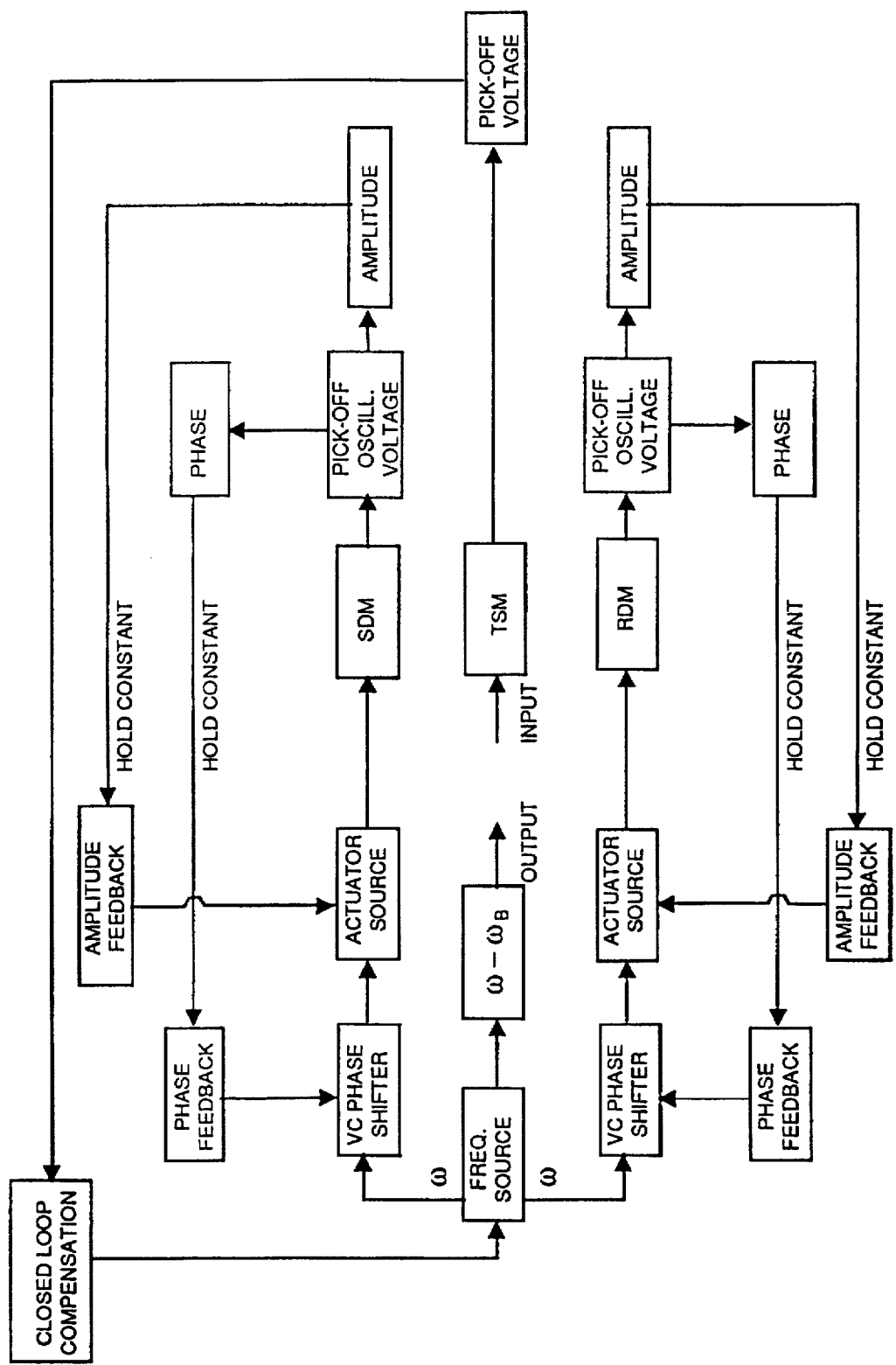
FIG. 7 is a similar diagram using frequency feedback operation with constant phase and amplitude.
Figure 8:
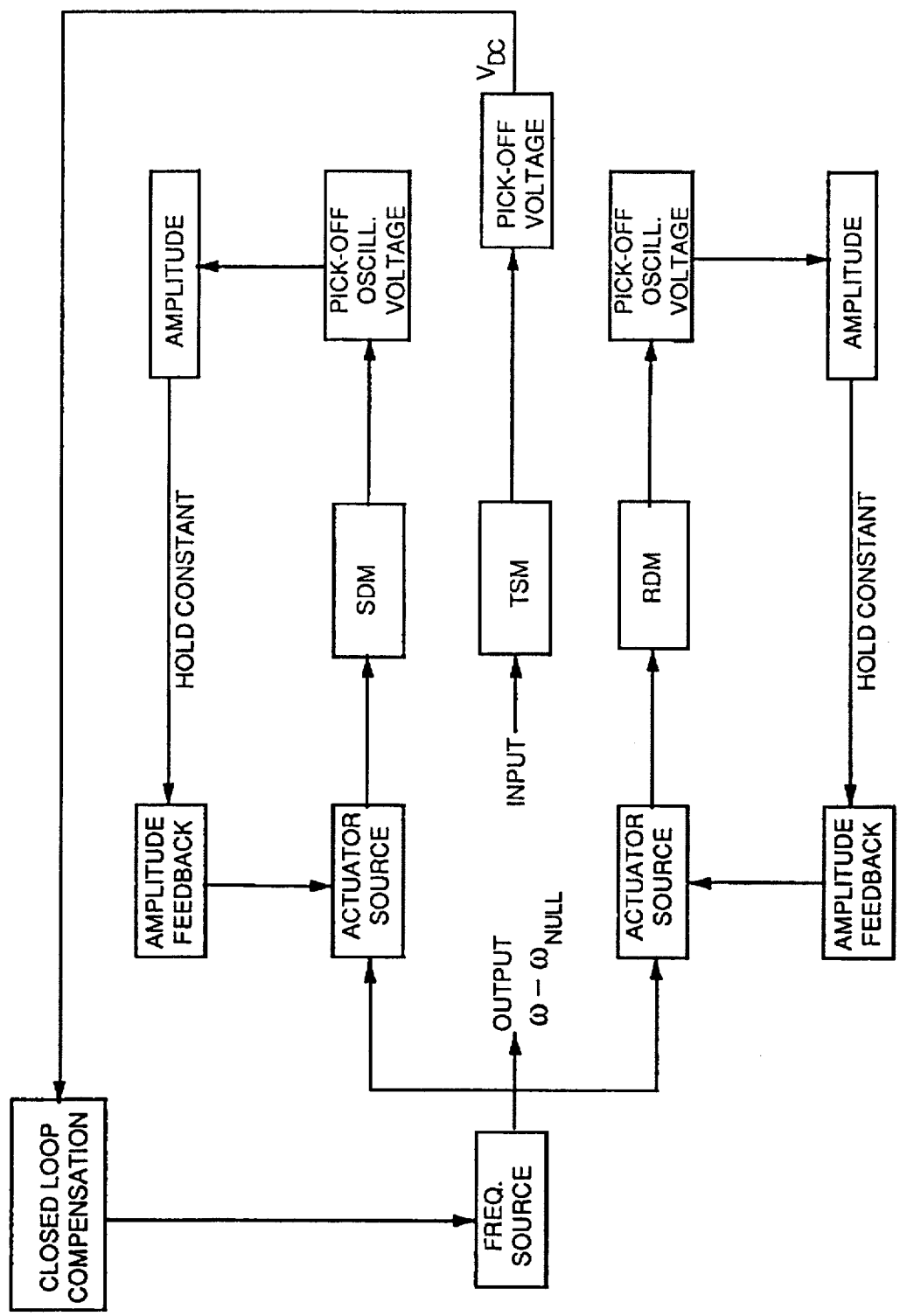
FIG. 8 is a similar diagram using frequency feedback operation with constant amplitude.

The schematic block diagram of FIGS. 5 through 8 represent the modes of operation described above: phase feedback (FIG. 5), amplitude feedback (FIG. 6), frequency feedback with constant phase and amplitude (FIG. 7), and frequency feedback with constant amplitude (FIG. 8). These represent four of many possible ways of varying phase, amplitude and frequency to achieve gyroscopic torque according to equation 18.

Phase feedback (FIG. 5) assumes that the SDM and RDM are driven by actuation sources. A common frequency input is provided to both. A Voltage Controlled Phase Shifter is also utilized prior to the SDM actuator source so that its oscillation phase can be varied. The oscillations of the RDM and SDM are picked off and the resulting AC voltage signals are processed to obtain the peak amplitudes and phases of the signals. For the RDM and the SDM the amplitudes are fed back in control loops to the actuator sources to hold the amplitudes constant. Subject to input acceleration, the TSM deflects because of its pendulosity and a pick-off DC voltage is generated. The voltage level is then compensated and fed back to the VC Phase Shifter of the SDM to change its phase so that the TSM is driven back to null. When this condition is met, the phase difference between the phases extracted is the output. Note that the phase difference is 90 degrees for zero acceleration input.

Note that a variation of the phase feedback operation is for the feedback to be applied to the RDM instead of the SDM oscillation phase, or to both.

Amplitude feedback (FIG. 6) assumes that the SDM and RDM are driven by actuation sources. A common frequency input is provided to both. Since the phases (or the phase difference) are to be kept constant, VC Phase Shifters are provided for both so that they can be controlled. The oscillations of the RDM and SDM are picked off and the resulting AC voltage signals are processed to obtain peak amplitudes and phases of the signals. For the RDM and SDM, the phases are fed back in control loops to the VC phase shifters to hold the phases or the phase difference between them constant. The amplitude of the RDM is fed back in a control loop to the RDM actuator source to keep the RDM amplitude constant. Subject to input acceleration, the TSM deflects because of its pendulosity and a pick-off DC voltage is generated. The voltage level is compensated and fed back to the SDM actuator source to change its amplitude so that the TSM is driven back to null. When this condition is met, the amplitude of the SDM is the output. Note that the amplitude of the SDM oscillation is zero for zero acceleration input.

Note that a variation of the amplitude feedback approach is for the feedback to be applied to the RDM amplitude instead of the SDM. For this case, the RDM amplitude is zero for zero acceleration input. A second variation is for the feedback to be applied to both amplitudes. For this case, both amplitudes could be zero for zero acceleration input if the amplitudes are kept equal, although other combinations of amplitudes could be used.

Frequency feedback for the case where the amplitudes and phases of the RDM and SDM are kept constant (FIG. 7) requires two sets of control loops for the amplitudes and phases. SDM and RDM oscillators are driven by actuator sources whose inputs are phase controlled by VC Phase Shifters. A common frequency is provided to both. The oscillations of the RDM and SDM are picked off and the resulting AC voltage signals are processed for amplitudes and phases. The amplitudes are fed back in control loops to the actuator sources to maintain the amplitudes constant. The phases are fed back in control loops to the VC phase shifters to maintain the phases or phase difference constant. Subject to input acceleration, the TSM deflects because of its pendulosity and a pick-off DC voltage is generated. The voltage level is compensated and a voltage controlled oscillator (frequency source) is varied to bring the TSM back to null. When this condition is met, the frequency change from a null frequency value is the output. Zero acceleration corresponds to the frequency which will drive a biased TSM so that the TSM reaches geometric null (perpendicularity with the RDM and SDM axes). A biased TSM has an initial rotation in the absence of acceleration or gyroscopic torques.

Frequency feedback for the case where the amplitudes are constant (FIG. 8) requires control loops for the amplitudes. The SDM and RDM are driven by actuator sources. A common frequency is provided to both. The oscillations of the RDM and SDM are picked off and the resulting AC voltage signals are processed for amplitudes and phases. The amplitudes are fed back in control loops to the actuator sources to maintain the amplitudes constant. Subject to input acceleration, the TSM deflects because of its pendulosity and a pick-off DC voltage is generated. The voltage level is compensated and fed back to the frequency source to change the drive frequency to drive the TSM back to null. When this condition is met, the frequency change from a null value is the output. Zero acceleration corresponds to that frequency for which the gyroscopic torque is zero. This value depends on the dynamics of the RDM and SDM.

THEORY OF POGA MULTI-SENSOR OPERATION

The POGA consists of three members connected so as to be allowed to rotate about three orthogonal axes, and a fixed member that is attachable to the vehicle or system. They may be called, the Rotor Driven Member (RDM), the Torque Summing Member (TSM), the Servo Driven Member (SDM) and the case or housing, respectively. The order of connection is: RDM to TSM, TSM to SDM and SDM to case or housing.

Figure 9:
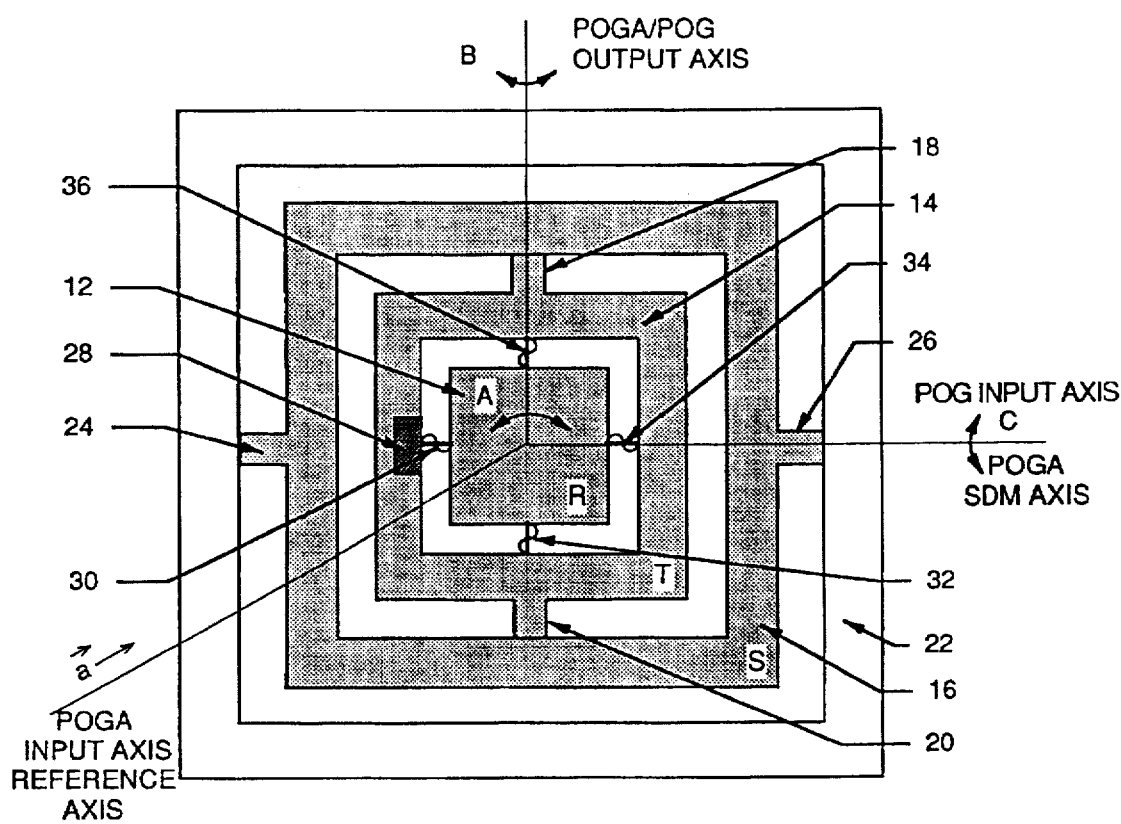
FIG. 9 is a schematic similar to FIG. 2A for an embodiment of a multi-sensor that senses both acceleration and rate according to this invention.

While this invention is compatible with all embodiments of the POGA disclosed in this application and in the patent incorporated herein by reference, the embodiment 10 shown in FIG. 9 will be used for describing the operation of the POGA multisensor of this invention, in which the POGA has separate outputs for acceleration and rate.

The pendulosity in this case is created by mass 28 that may be fixed to RDM 12, and/or TSM 14 as shown. In this case it is fixed to the TSM, and the POGA input axis is thereby defined as being along the reference axis. The pendulosity is acted upon by a specific acceleration force a acting along the input axis. The TSM 14 rotates about the output axis and a read-out (not shown) measures the angle. A servo loop (not shown) provides a response to the RDM and/or SDM actuators (not shown) to vary the relative phases or the amplitudes of oscillation or the common frequency of oscillation to counterbalance the pendulosity torque. The phase, amplitude or frequency changes then become a measure of acceleration detected. The POGA, its embodiments and its operation are disclosed above and in the patent incorporated herein by reference.

Figure 10:
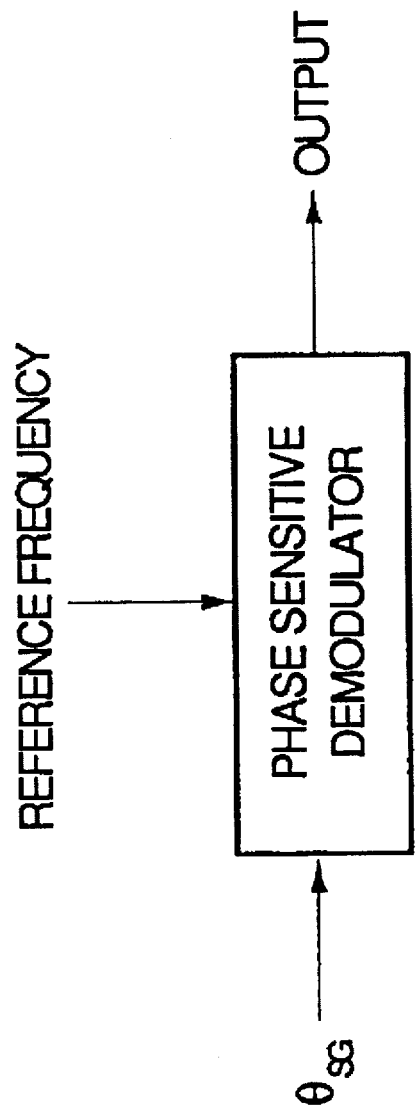
FIG. 10 is a block diagram of the electronics that need to be added to the disclosed POGA designs to use the POGA as a multi-sensor.

Any angular rate of POGA 10 about the POGA SDM axis will act upon the instantaneous angular momentum of the sinusoidally oscillating RDM to produce a sinusoidal torque on the TSM with a resulting oscillatory motion of the TSM about the output axis, termed $\theta_{SG}$. This motion will be at the same frequency as the oscillation of the RDM, and its amplitude will be directly related to the angular rate about the SDM axis. Therefore, a signal proportional to the input angular rate can be obtained by properly demodulating the signal contained in $\theta^{SG}$ with a phase sensitive demodulator as shown in FIG. 10. This signal is independent of the acceleration environment.

THEORY OF AMPLITUDE OSCILLATING GYROSCOPE (AOG) OPERATION

Figure 11A:
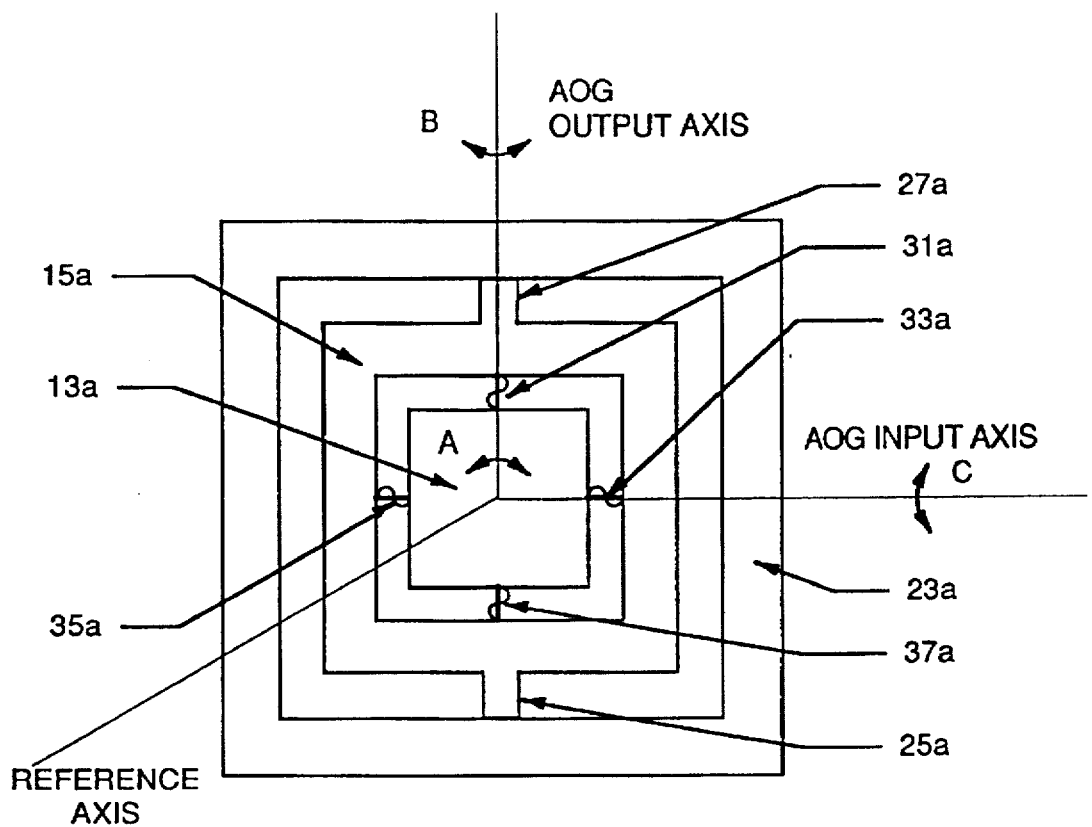
FIGS. 11A, 11B and 11C are schematic diagrams similar to that of FIG. 9 for an Amplitude Oscillating Gyroscope (AOG) according to this invention, using techniques similar to those used in the POGA but without an accelerometer output.

FIG. 11A represents a schematic embodiment of an Amplitude Oscillating Gyroscope (AOG), which is the Pendulous Oscillating Gyroscope of the POGA without the pendulum. This instrument is not an accelerometer. It is obtained by removing the SDM from the POGA and pivotably connecting the TSM to the case/housing directly. The pendulous mass is also removed, as otherwise the TSM will be deflected under acceleration, affecting its orthogonal alignment to the RDM and the case/housing.

Figure 11B:
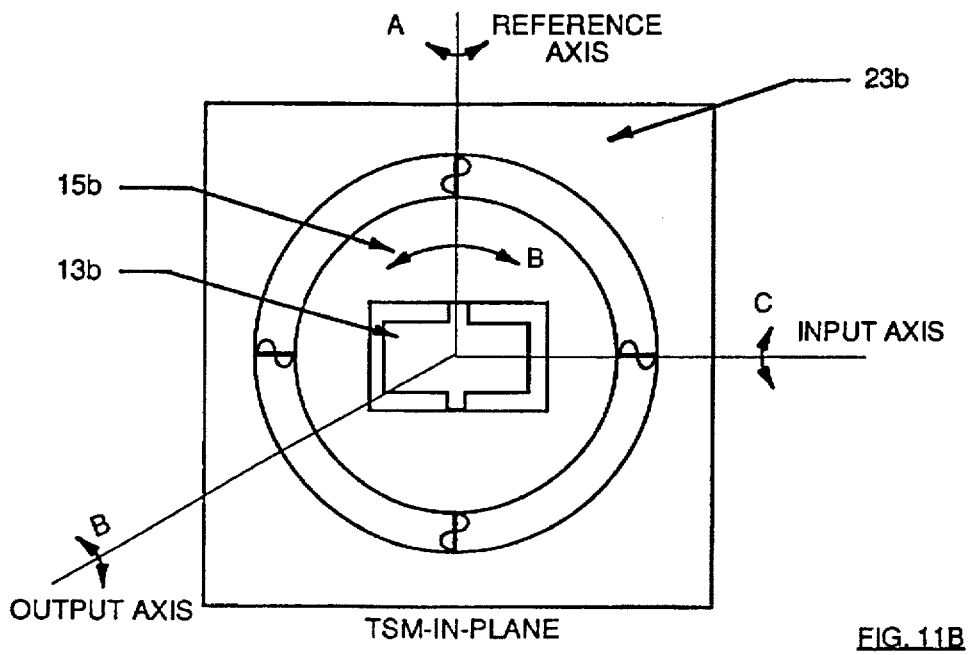
Figure 11C:
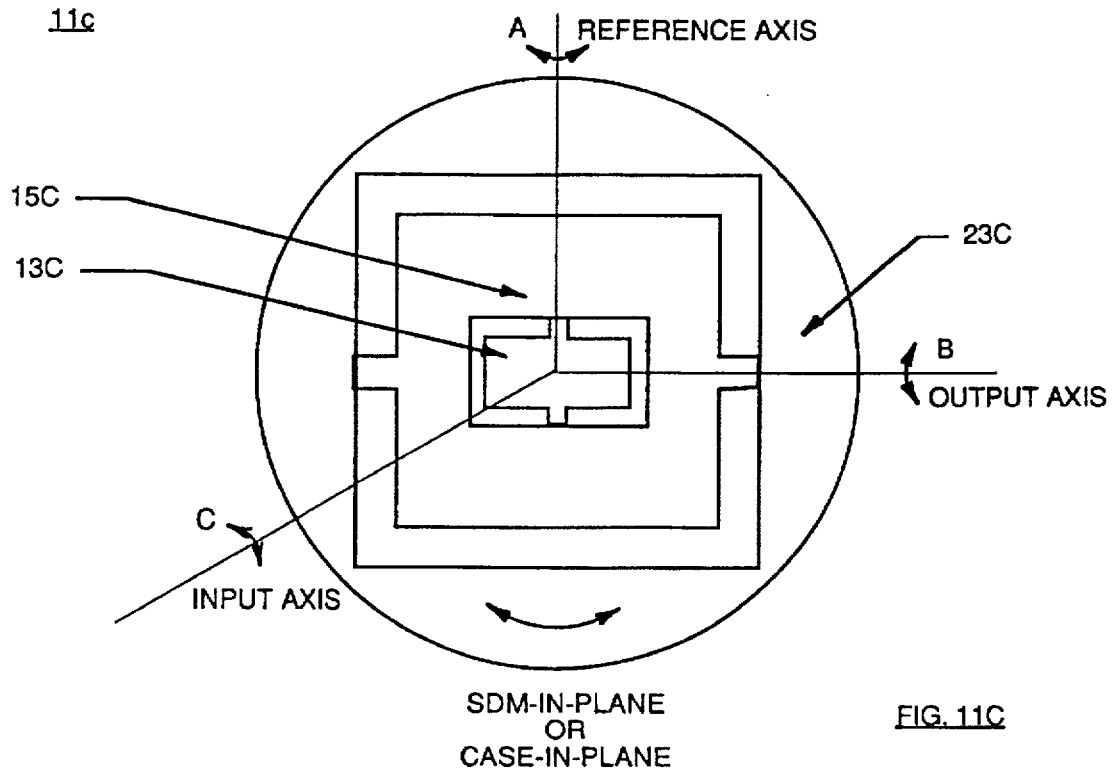

Shown in FIG. 11A is AOG 11a, which includes an RDM 13a that is oscillated about the reference axis as shown by arrow A. RDM 13a is pivotably mounted to TSM 15a by mounts 31a, 33a, 35a, 37a. These mounts are representative of the particular design shown. Other approaches are also possible. RDM 13a rides within TSM 15a which itself is pivotably mounted to case/housing 23a by mounts 25a and 27a that allow TSM 15a to rotate about the output axis as shown by arrow B. Under rotation about the AOG input axis by the vehicle or system to which case/housing 23a is mounted, TSM 15a oscillates at the same frequency as RDM 13a with an amplitude that is proportional to the rotation rate. Two other variations of the AOG are also possible that correspond to FIGS. 2B and 2C. The AOG of FIG. 11A corresponds to the POGA of FIG. 2A. The AOGs of FIGS. 11B and 11C correspond to FIGS. 2B and 2C, respectively. In FIGS. 11A through 11C, like parts are numbered alike.

Although planar schematics are shown, conventional three dimensional configurations could be used. Three dimensional designs could have members whose surfaces are in three orthogonal planes as opposed to one as shown.

Multisensor Operation

Figure 12:
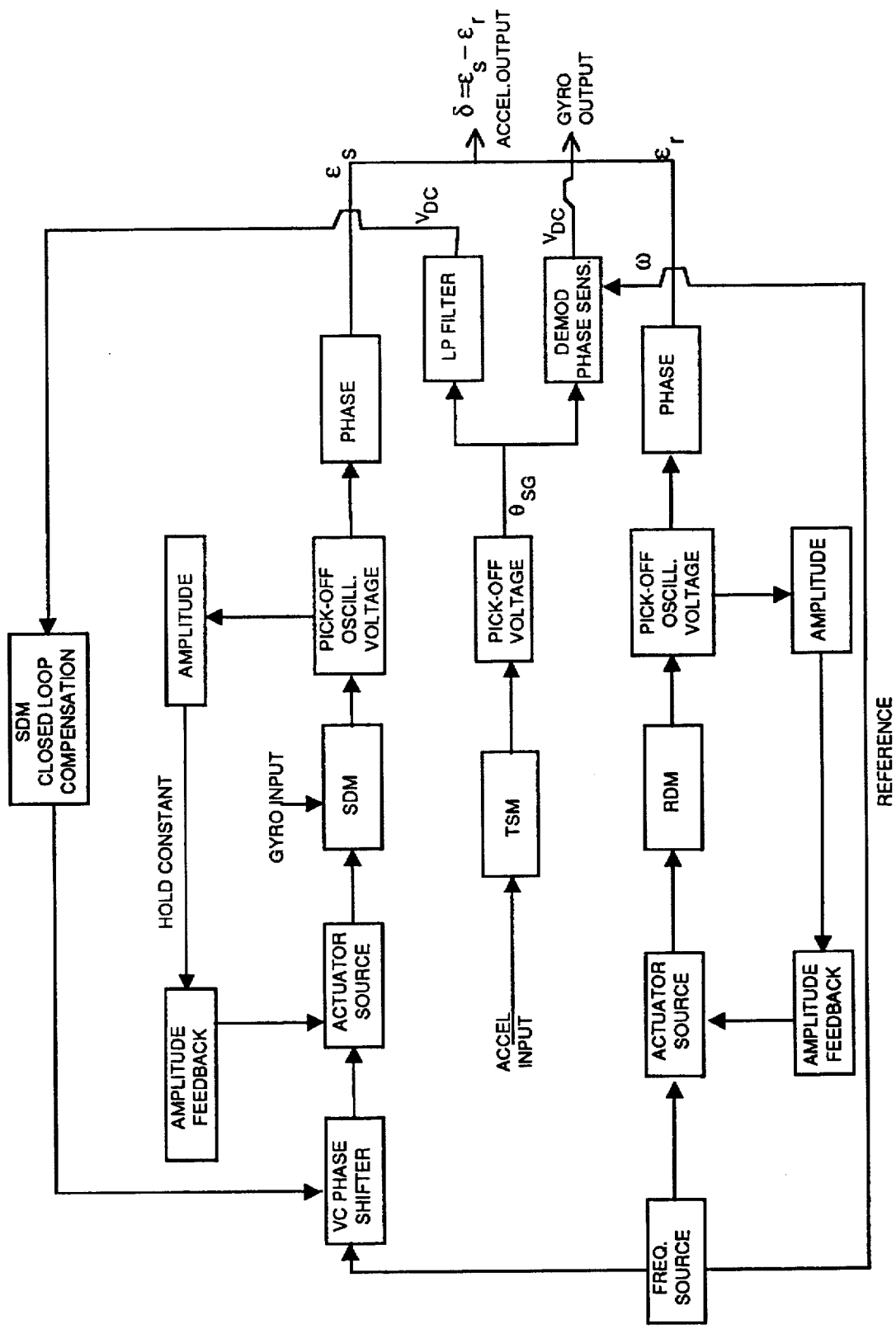
FIG. 12 is a diagram similar to FIGS. 5 through 8 for a manner in which the multisensor of this invention can be operated with phase feedback.

To describe the multi-sensor operation, in which both acceleration and rate information is obtained from the POGA, the POGA multisensor of FIG. 9 operated with phase feedback is used as an example. The description is according to FIG. 12. Phase feedback assumes that the SDM and RDM are driven by actuation sources. A common frequency input is provided to both. A Voltage Controlled Phase Shifter is also utilized prior to the SDM actuator source so that the SDM oscillation phase can be varied. The oscillations of the RDM and SDM are picked off and the resulting AC voltage signals are processed to obtain the peak amplitudes and phases of the signals. For the RDM and the SDM the amplitudes are fed back in control loops to the actuator sources to hold the amplitudes constant. Subject to input acceleration, the TSM deflects because of its pendulosity, and a pick-off DC voltage is generated. The voltage level is then compensated and fed back to the VC Phase Shifter of the SDM to change its phase so that the TSM is driven back to null. When this condition is met, the phase difference between the phases extracted is the acceleration output. Note that the phase difference is 90 degrees for zero acceleration input.

When the vehicle carrying the POGA rotates about the POGA SDM axis, the TSM develops an oscillation at the same frequency as the RDM. A demodulation of the TSM picked off signal, with the reference frequency provided by the frequency source, gives the amplitude of the signal, which is proportional to the gyro input rate. The signal amplitude is also proportional to the RDM oscillation amplitude, so it is necessary to maintain the RDM oscillation amplitude constant. The greater the RDM amplitude, the greater the sensitivity of the instrument. The stability of the scale factor is dependent on the stability of the oscillation amplitude.

In the case where both acceleration and rotational inputs are present, the TSM will contain a DC component due to the pendulosity, and an AC component due to the rotational input. The DC component is held at null by the control loop that varies the phase of the SDM. In order that the AC component is not controlled by the SDM loop, the TSM signal is split, and one half is low pass filtered to remove the oscillation component. The resulting DC signal is then used for the SDM loop for the accelerometer. The other half of the split signal is phase demodulated at the RDM oscillation frequency to extract the amplitude of the AC oscillation. This is proportional to the gyro input. The gyro signal is not maintained at null (zero oscillation amplitude). The purpose of gyros in a system is to align the accelerometers in inertial space. The nulling of the gyro is accomplished when the POGA is aligned by the system subject to the rotational input sensed by the POG. A system may comprise a gimbal platform that is maintained stable in inertial space so that as the vehicle rotates, the gyro senses the rotation and the system is counter-rotated to maintain the accelerometer pointed in the same direction, hence nulling the gyro.

For the POGs that correspond to FIGS. 2B and 2C, the input axis is still the SDM axis. The POGs are the gyros in the POGAs. The POGA multisensor is more restrictive in the operability options. It is subject to the requirement of the POG gyros that the RDM oscillation amplitude be maintained constant. The reason is that the scale factor (proportionality) that relates the gyro input to the oscillation amplitude depends on the RDM amplitude. Phase feedback operation maintains the RDM oscillation amplitude constant. Amplitude feedback, where the SDM amplitude is the servoed quantity, also maintains RDM oscillation constant. If RDM oscillation amplitude is not held constant, the scale factor will change, which is undesirable. However, it could be possible to operate in this manner.

AOG Operation

Figure 13:
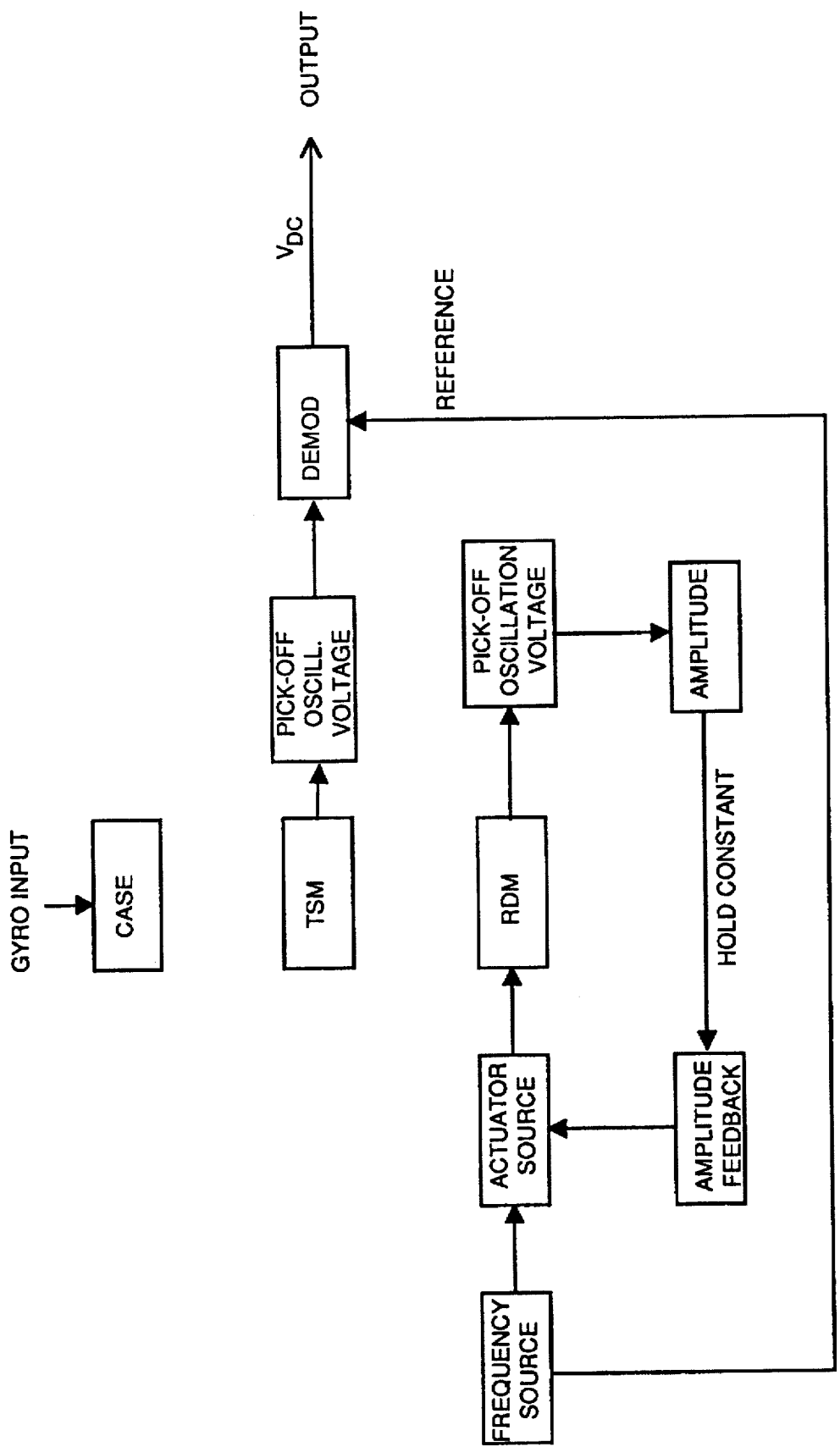
FIG. 13 is a similar block diagram for a manner of operation of the Amplitude Oscillating Gyroscope of FIGS. 11A, 11B and 11C.

FIG. 13 is the operational diagram for the Amplitude Oscillating Gyro (AOG) as shown in FIGS. 11A, 11B and 11C. An actuator source provides the drive for the RDM. The frequency of the oscillation is set by the frequency source. A pick-off of the RDM oscillation amplitude is done to maintain the RDM oscillation amplitude constant. In the presence of rotation of the vehicle about the AOG input axis (case is attached to the vehicle), an oscillation is generated on the TSM and detected by a pick-off. The pick-off signal is then demodulated with a reference waveform obtained from the frequency source. The resulting DC value is proportional to gyro rate.

POGA EQUATIONS

TSM EQUATION OF MOTION $$\bar{L} = \left(\frac{d\bar{H}}{dt}\right)_I \quad (1)$$

$$\left(\frac{d\bar{H}_f}{dt}\right)_I = \left(\frac{d\bar{H}_f}{dt}\right)_f + \bar{\omega} \times \bar{H}_f = \bar{L}_f \quad (2)$$

$$\bar{H}_f = H_r \hat{s} + \bar{\bar{I}} \cdot \bar{\omega} \quad (3)$$

$$\left(\frac{d\bar{H}_f}{dt}\right)_I = L_{fs}\hat{s} + L_{fi}\hat{i} + L_{fo}\hat{o} = \bar{L}_f \quad (4)$$

$$= \left[(\bar{\omega} \times \bar{H}_f)_s + \frac{dH_{fs}}{dt}\right]\hat{s} + \text{etc.} \quad (5)$$

$$= [I_o(\ddot{\phi}_x + \dot{\upsilon}\dot{\phi}_y + \upsilon\ddot{\phi}_y) + \dot{H}_r + \\
(\dot{\phi}_y - \upsilon\dot{\phi}_x)I_o(\dot{\phi}_z + \upsilon) - (\dot{\phi}_z + \upsilon)I_i(\dot{\phi}_y - \upsilon\dot{\phi}_x)]\hat{s} + \\
[I_i(\ddot{\phi}_y - \upsilon\ddot{\phi}_x - \dot{\upsilon}\dot{\phi}_x) - (\dot{\phi}_x + \upsilon\dot{\phi}_y)I_o(\dot{\phi}_z + \upsilon) + \\
(\dot{\phi}_z + \upsilon)\{I_s(\dot{\phi}_x + \upsilon\dot{\phi}_y) + H_r\}]\hat{i} + \\
[I_o(\ddot{\phi}_z + \ddot{\upsilon}) + (\dot{\phi}_x + \upsilon\dot{\phi}_y)I_i(\dot{\phi}_y - \upsilon\dot{\phi}_x) - \\
(\dot{\phi}_y + \upsilon\dot{\phi}_x)\{I_s(\dot{\phi}_x + \upsilon\dot{\phi}_y) + H_r\}]\hat{o} \quad (6)$$

$$L_{fo} = I_o(\ddot{\phi}_z + \ddot{\upsilon}) + (\dot{\phi}_x + \upsilon\dot{\phi}_y)I_i(\dot{\phi}_y - \upsilon\dot{\phi}_x) - \\
(\dot{\phi}_y - \upsilon\dot{\phi}_x)\{I_s(\dot{\phi}_x + \upsilon\dot{\phi}_y) + H_r\} \\
= I_o(\ddot{\phi}_z + \ddot{\upsilon}) + (I_i - I_s)(\dot{\phi}_y - \upsilon\dot{\phi}_x)(\dot{\phi}_x + \upsilon\dot{\phi}_y) - (\dot{\phi}_y - \upsilon\dot{\phi}_x)H_r \quad (7)$$

$$L_{fo} = I_o(\ddot{\phi}_z + \ddot{\upsilon}) - (\dot{\phi}_y - \upsilon\dot{\phi}_x)H_r \quad (8)$$

$$L_{fo} = -D\dot{\upsilon} - K\upsilon + L_e - L_a \quad (9)$$

$$I_o(\ddot{\phi}_z + \ddot{\upsilon}) - (\dot{\phi}_y - \upsilon\dot{\phi}_x)H_r = -D\dot{\upsilon} - K\upsilon + L_e - L_a \quad (10)$$

or $$I_o\ddot{\upsilon} + D\dot{\upsilon} + K\upsilon = H_r\dot{\phi}_y - I_o\ddot{\phi}_z - H_r\upsilon\dot{\phi}_x + L_e - L_a$$

$$I_o\ddot{\upsilon} + D\dot{\upsilon} + K\upsilon = H_r\dot{\phi}_y - L_a \quad (11)$$

POGA EQUATIONS (continued)

$$\phi_y = \tilde{\phi}_y \sin(\omega_y t + \delta) \text{ and } \dot{\phi}_y = \omega_y \tilde{\phi}_y \cos(\omega_y t + \delta) \quad (12)$$

$$\phi_r = \tilde{\phi}_r \sin\omega_r t \text{ and } \dot{\phi}_r = \omega_r \tilde{\phi}_r \cos\omega_r t \quad (13)$$

$$H_r = I_r \dot{\phi}_r = \omega_r \tilde{\phi}_r I_r \cos\omega_r t \quad (14)$$

$$\upsilon(t) = \frac{W/2 \cos\delta - L_a}{I_o(e^2 + \omega_1^2)} + \\
\frac{W}{2I_o\omega_1} A(\omega)\sin(2\omega t + \delta) + \\
\frac{W}{2I_o\omega_1} B(\omega)\cos(2\omega t + \delta) \\
\equiv \upsilon_{DC} + \upsilon_{AC} \quad (15)$$

$$L_a = \frac{W}{2}\cos\delta \text{ where } W = I_r\omega_r^2\tilde{\phi}_y\tilde{\phi}_r \quad (16)$$

$$L_a = \frac{W}{2}\cos\delta = m_p R_p a \quad (17)$$

$$a = \frac{I_r\omega_r^2\tilde{\phi}_y\tilde{\phi}_r}{2m_p R_p}\cos\delta \text{ where } I_r = \frac{1}{2}m_r R_r^2 \quad (18)$$

$$\upsilon_{DC} = \frac{I_r\omega_r^2\tilde{\phi}_y\tilde{\phi}_r}{2K}\cos\delta \quad (19)$$

$$\upsilon_{DC} = \frac{m_p R_p}{I_o\omega_o^2} a \quad (20)$$

ROTOR EQUATION OF MOTION $$I_r\ddot{\phi}_r + D_r\dot{\phi}_r + K_r\phi_r = L_r \quad (21)$$

$$\phi_r(t) = \tilde{\phi}_r\sin(\omega_r t - e_r) \quad (22)$$

$$e_r = \tan^{-1}\left[\frac{D_r\omega}{I_r(\omega_{r1}^2 - \omega^2)}\right] \quad (23)$$

where $\omega_{r1}^2 = \omega_{ro}^2 - e_r^2$ and $e_{r1} = \frac{D_r}{2I_r}$ $$\tilde{\phi}_r = \frac{\tilde{L}_r}{[D_r^2\omega^2 + I_r^2(\omega_{ro}^2 - \omega^2)^2]^{1/2}} \quad (24)$$

$$\tilde{L}_r = [D_r^2\omega^2 + I_r^2(\omega_{ro}^2 - \omega^2)^2]^{1/2} \tilde{\phi}_r \quad (25)$$

SDM EQUATION of MOTION $$(I_i + J_y)\ddot{\phi}_y + D_y\dot{\phi}_y + K_y\phi_y = -L_y \quad (27)$$

$$e_y = \tan^{-1}\left[\frac{D_y\omega}{(I_i + J_y)(\omega_{y1}^2 - \omega^2)}\right] \text{ where } \omega_{y1}^2 = \omega_{yo}^2 - e_y^2 \quad (28)$$

$$e_y = \frac{D_y}{2(I_i + J_y)} \quad (29)$$

$$\tilde{\phi}_y = \frac{\tilde{L}_y}{[D_y^2\omega^2 + (I_i + J_y)^2(\omega_{yo}^2 - \omega^2)^2]^{1/2}} \quad (30)$$

$$\tilde{L}_y = [D_y^2\omega^2 + (I_i + J_y)^2(\omega_{yo}^2 - \omega^2)^2]^{1/2} \tilde{\phi}_y \quad (31)$$

SCALE FACTORS $$a = \left[\frac{I_r\omega^2}{2m_p R_p}\tilde{\phi}_r\cos(\delta)\right]\tilde{\phi}_y \quad (32)$$

$$a = \frac{I_r\omega^2\tilde{\phi}_y\tilde{\phi}_r}{2m_p R_p}\cos(e_r - e_y) \text{ where } \delta = e_r - e_y \quad (33)$$

-continued
POGA EQUATIONS $$a = \left[ \frac{I_r}{2m_p R_p} \tilde{\phi}_y \tilde{\phi}_r \cos(\epsilon_r - \epsilon_y) \right] \omega^2 \quad (34a)$$

$$a = \frac{I_r \omega^2 \tilde{\phi}_y(\omega) \tilde{\phi}_r(\omega)}{2m_p R_p} \cos(\epsilon_r(\omega) - \epsilon_y(\omega)) \quad (34b)$$

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A pendulous oscillating gyroscope and accelerometer multisensor having an accelerometer input axis and a gyroscopic input axis, comprising:

a fixed case;

a servo driven member mounted to said case for sinusoidal oscillation about an accelerometer servo axis which is the same as the gyroscopic input axis;

a torque summing member mounted to said servo driven member to allow rotational motion about an output axis transverse to said servo axis;

a rotor driven member mounted to said torque summing member for sinusoidal oscillation about a reference axis transverse to both said output axis and said servo axis;

a pendulosity carried by at least one of said torque summing member and said rotor driven member to create a mass imbalance about the output axis, in which pendulosity torque due to acceleration along the accelerometer input axis causes a DC rotation of said torque summing member about said output axis;

first oscillation means for sinusoidally oscillating said rotor driven member about said reference axis, the oscillation having a first amplitude, a first frequency and a first phase;

second oscillation means for sinusoidally oscillating said servo driven member about said servo axis, the oscillation having a second amplitude, a second frequency and a second phase;

wherein the oscillations of said rotor driven member and of said servo driven member create a first gyroscopic torque, which causes DC rotation of said torque summing member about said output axis, and wherein DC rotation of said fixed case about said gyroscopic input axis creates a second gyroscopic torque, which causes an AC oscillation of said torque summing member about said output axis;

measurement means for determining the rotational motion of said torque summing member about said output axis;

control means, responsive to said measurement means, for altering the oscillation of at least one of said first and second oscillation means to create a change in said first gyroscopic torque to counterbalance pendulosity torque;

means, responsive to said control means, for determining acceleration of said multisensor along said accelerometer input axis; and means, responsive to said measurement means, for determining the rotational rate of said multisensor about said gyroscopic input axis.

2. The pendulous oscillating gyroscope and accelerometer multisensor of claim 1 in which said first frequency and said second frequency are the same.

3. The pendulous oscillating gyroscope and accelerometer multisensor of claim 2 in which the phase difference of the oscillations of said rotor driven member and of said servo driven member is constant.

4. The pendulous oscillating gyroscope and accelerometer multisensor of claim 3 in which said control means alters at least one of said first and second amplitudes.

5. The pendulous oscillating gyroscope and accelerometer multisensor of claim 2 in which said control means alters the phase difference between the first phase and the second phase.

6. The pendulous oscillating gyroscope and accelerometer multisensor of claim 2 in which said control means alters both said first and second frequencies together.

7. The pendulous oscillating gyroscope and accelerometer multisensor of claim 6 in which said control means maintains said first and sensor amplitudes constant.

8. The pendulous oscillating gyroscope and accelerometer multisensor of claim 6 in which said control means maintains the phase difference between the first phase and the second phase constant.

9. The pendulous oscillating gyroscope and accelerometer multisensor of claim 1 in which said first oscillation means oscillates said rotor driven member at resonance.

10. The pendulous oscillating gyroscope and accelerometer multisensor of claim 1 in which said second oscillation means oscillates said servo driven member at resonance.

11. The pendulous oscillating gyroscope and accelerometer multisensor of claim 1 in which said first oscillation means oscillates said rotor driven member at resonance, and said second oscillation means oscillates said servo driven member at resonance.

12. The pendulous oscillating gyroscope and accelerometer multisensor of claim 1 in which said first and said second oscillation means are both electromagnetic drives.

13. The pendulous oscillating gyroscope and accelerometer multisensor of claim 1 in which said first oscillation means is an electromagnetic drive and said second oscillation means is an electrostatic drive.

14. The pendulous oscillating gyroscope and accelerometer multisensor of claim 1 further including means for determining the oscillation of said rotor driven member about said reference axis.

15. The pendulous oscillating gyroscope and accelerometer multisensor of claim 1 in which said first oscillation means is an electrostatic drive and said second oscillation means is an electromagnetic drive.

16. The pendulous oscillating gyroscope and accelerometer multisensor of claim 1 in which said first and said second oscillation means are both electrostatic drives.

17. The pendulous oscillating gyroscope and accelerometer multisensor of claim 1 in which said measurement means includes a non-contact measurement device.

18. The pendulous oscillating gyroscope and accelerometer multisensor of claim 17 in which said measurement device is capacitive.

19. The pendulous oscillating gyroscope and accelerometer multisensor of claim 17 in which said measurement device is electromagnetic.

20. The pendulous oscillating gyroscope and accelerometer multisensor of claim 17 in which said measurement device is optical.

21. The pendulous oscillating gyroscope and accelerometer multisensor of claim 1 further including means for determining the oscillation of said servo driven member about said servo axis.

22. The pendulous oscillating gyroscope and accelerometer multisensor of claim 1 in which said means for determining rotation includes a phase sensitive demodulator for producing a signal related to the angular rate of rotation of said pendulous oscillating gyroscope and accelerometer about said servo axis.

23. The pendulous oscillating gyroscope and accelerometer multisensor of claim 22 in which said phase sensitive demodulator has two inputs, one from said measurement means, and one from at least one of said first and second oscillation means.

24. A pendulous oscillating gyroscope, comprising:
a fixed case;
a torque summing member mounted to said case for rotation about an output axis;
a rotor driven member mounted to said torque summing member for sinuodial oscillation about a reference axis transverse to said output axis;
oscillation means for oscillating said rotor driven member about said reference axis, the oscillation having an amplitude and a frequency;
measurement means for determining the rotational motion of said torque summing member about said output axis caused by rotation of said gyroscope about an input axis transverse to both said output axis and said reference axis; and
means, responsive to said measurement means, for determining rotation of said gyroscope about said input axis.

25. The pendulous oscillating gyroscope of claim 24 in which said means for determining rotation is further responsive to said oscillation means.

26. The pendulous oscillating gyroscope of claim 25 in which said means for determining rotation includes a phase sensitive demodulator for producing a signal related to the angular rate of rotation of said gyroscope about said input axis.

27. The pendulous oscillating gyroscope of claim 24 further including control means for altering said oscillation means to maintain the rotor driven member oscillation amplitude constant.

28. The pendulous oscillating gyroscope of claim 24 in which said rotor driven member is a generally planar member mounted by a plurality of spaced flexures to said torque summing member, and said torque summing member is generally planar, and the reference axis is normal to the rotor driven member, whereby the oscillation of said rotor driven member is within the plane of said rotor driven member.

29. The pendulous oscillating gyroscope of claim 28 in which said torque summing member is a generally planar member surrounding said rotor driven member, and is pivotably mounted to said fixed case to pivot about the output axis.

30. The pendulous oscillating gyroscope of claim 24 in which said rotor driven member is generally planar and is pivotably mounted within said torque summing member, to pivot about the reference axis.

31. The pendulous oscillating gyroscope of claim 30 in which said torque summing member is a generally planar member and is mounted by a plurality of spaced flexures to said fixed case, and the output axis is normal to the torque summing member, whereby the torque summing member pivots within its plane about the output axis.

32. The pendulous oscillating gyroscope of claim 24 in which said rotor driven member is pivotably mounted within said torque summing member, to pivot about the reference axis, and said rotor driven member and said torque summing member are each generally planar.

33. The pendulous oscillating gyroscope of claim 32 in which said torque summing member is pivotably mounted to said fixed case, to pivot about the output axis.

34. A pendulous oscillating gyroscope and accelerometer multisensor having an accelerometer input axis and a gyroscopic input axis, comprising:
a fixed case;
a generally planar servo driven member mounted to said case for sinusoidal oscillation within the plane of said servo driven member and about an accelerometer servo axis which is the same as the gyroscopic input axis;
a generally planar torque summing member mounted to said servo driven member to allow rotational motion about an output axis transverse to said servo axis;
a generally planar rotor driven member mounted to said torque summing member for sinusoidal oscillation about a reference axis transverse to both said output axis and said servo axis;
a pendulosity carried by at least one of said torque summing member and said rotor driven member to create a mass imbalance about the output axis, in which pendulosity torque due to acceleration along the accelerometer input axis causes a DC rotation of said torque summing member about said output axis;
first oscillation means for sinusoidally oscillating said rotor driven member about said reference axis, the oscillation having a first amplitude, a first frequency and a first phase;
second oscillation means for sinusoidally oscillating said servo driven member about said servo axis, the oscillation having a second amplitude, a second frequency and a second phase;
wherein the oscillations of said rotor driven member and of said servo driven member create a first gyroscopic torque, which causes DC rotation of said torque summing member about said output axis, and wherein DC rotation of said fixed case about said gyroscopic input axis creates a second gyroscopic torque, which causes an AC oscillation of said torque summing member about said output axis;
measurement means for determining the rotational motion of said torque summing member about said output axis;
control means, responsive to said measurement means, for altering the oscillation of at least one of said first and second oscillation means to create a change in said first gyroscopic torque to counterbalance pendulosity torque;
means, responsive to said control means, for determining acceleration of said multisensor along said accelerometer input axis; and
means, responsive to said measurement means, for determining the rotational rate of said multisensor about said gyroscopic input axis.

35. A pendulous oscillating gyroscope and accelerometer multisensor having an accelerometer input axis and a gyroscopic input axis, comprising:
a fixed case;
a generally planar servo driven member mounted to said case for sinusoidal oscillation about an accelerometer servo axis which is the same as the gyroscopic input axis;
a generally planar torque summing member mounted to said servo driven member to allow rotational motion within the plane of said torque summing member and about an output axis transverse to said servo axis;
a generally planar rotor driven member mounted to said torque summing member for sinusoidal oscillation about a reference axis transverse to both said output axis and said servo axis;

a pendulosity carried by at least one of said torque summing member and said rotor driven member to create a mass imbalance about the output axis, in which pendulosity torque due to acceleration along the accelerometer input axis causes a DC rotation of said torque summing member about said output axis;

first oscillation means for sinusoidally oscillating said rotor driven member about said reference axis, the oscillation having a first amplitude, a first frequency and a first phase;

second oscillation means for sinusoidally oscillating said servo driven member about said servo axis, the oscillation having a second amplitude, a second frequency and a second phase;

wherein the oscillations of said rotor driven member and of said servo driven member create a first gyroscopic torque, which causes DC rotation of said torque summing member about said output axis, and wherein DC rotation of said fixed case about said gyroscopic input axis creates a second gyroscopic torque, which causes an AC oscillation of said torque summing member about said output axis;

measurement means for determining the rotational motion of said torque summing member about said output axis;

control means, responsive to said measurement means, for altering the oscillation of at least one of said first and second oscillation means to create a change in said first gyroscopic torque to counterbalance pendulosity torque;

means, responsive to said control means, for determining acceleration of said multisensor along said accelerometer input axis; and means, responsive to said measurement means, for determining the rotational rate of said multisensor about said gyroscopic input axis.

36. A pendulous oscillating gyroscope and accelerometer multisensor having an accelerometer input axis and a gyroscopic input axis, comprising:

a fixed case;

a generally planar servo driven member mounted to said case for sinusoidal oscillation about an accelerometer servo axis which is the same as the gyroscopic input axis;

a generally planar torque summing member mounted to said servo driven member to allow rotational motion about an output axis transverse to said servo axis;

a generally planar rotor driven member mounted to said torque summing member for sinusoidal oscillation within the plane of said rotor driven member and about a reference axis transverse to both said output axis and said servo axis;

a pendulosity carried by at least one of said torque summing member and said rotor driven member to create a mass imbalance about the output axis, in which pendulosity torque due to acceleration along the accelerometer input axis causes a DC rotation of said torque summing member about said output axis;

first oscillation means for sinusoidally oscillating said rotor driven member about said reference axis, the oscillation having a first amplitude, a first frequency and a first phase;

second oscillation means for sinusoidally oscillating said servo driven member about said servo axis, the oscillation having a second amplitude, a second frequency and a second phase;

wherein the oscillations of said rotor driven member and of said servo driven member create a first gyroscopic torque, which causes DC rotation of said torque summing member about said output axis, and wherein DC rotation of said fixed case about said gyroscopic input axis creates a second gyroscopic torque, which causes an AC oscillation of said torque summing member about said output axis;

measurement means for determining the rotational motion of said torque summing member about said output axis;

control means, responsive to said measurement means, for altering the oscillation of at least one of said first and second oscillation means to create a change in said first gyroscopic torque to counterbalance pendulosity torque;

means, responsive to said control means, for determining acceleration of said multisensor along said accelerometer input axis; and means, responsive to said measurement means, for determining the rotational rate of said multisensor about said gyroscopic input axis.

* * * * *